United States Patent
Nomi

(10) Patent No.: US 9,882,741 B2
(45) Date of Patent: Jan. 30, 2018

(54) COMMUNICATION APPARATUS AND COMMUNICATION METHOD

(71) Applicant: ALAXALA Networks Corporation, Kawasaki-shi, Kanagawa (JP)

(72) Inventor: Motohide Nomi, Kawasaki (JP)

(73) Assignee: Alaxala Networks Corporation, Kanagawa (JP)

(*) Notice: Subject to any disclaimer, the term of this patent is extended or adjusted under 35 U.S.C. 154(b) by 88 days.

(21) Appl. No.: 14/959,149

(22) Filed: Dec. 4, 2015

(65) Prior Publication Data

US 2016/0248601 A1 Aug. 25, 2016

(30) Foreign Application Priority Data

Feb. 19, 2015 (JP) .................. 2015-030159

(51) Int. Cl.
| | |
|---|---|
| *H04L 12/18* | (2006.01) |
| *H04L 12/46* | (2006.01) |
| *H04L 12/911* | (2013.01) |
| *H04L 12/927* | (2013.01) |
| *H04L 12/801* | (2013.01) |
| *H04L 29/08* | (2006.01) |
| *H04L 12/721* | (2013.01) |
| *H04L 12/26* | (2006.01) |

(52) U.S. Cl.
CPC ...... *H04L 12/4641* (2013.01); *H04L 43/0811* (2013.01); *H04L 45/66* (2013.01); *H04L 47/13* (2013.01); *H04L 47/805* (2013.01); *H04L 47/825* (2013.01); *H04L 69/321* (2013.01)

(58) Field of Classification Search
CPC ......... H04L 12/4641; H04L 2012/4629; H04L 45/66; H04L 12/4679; H04L 47/805; H04L 47/825; H04L 12/4633; H04L 49/354; H04L 12/4675; H04L 12/18
See application file for complete search history.

(56) References Cited

U.S. PATENT DOCUMENTS

| | | | |
|---|---|---|---|
| 2014/0351812 A1 | 11/2014 | Imai et al. | |
| 2015/0124591 A1* | 5/2015 | Nakagawa | H04L 41/0659 370/225 |
| 2015/0215189 A1* | 7/2015 | Lim | H04L 12/4633 370/252 |
| 2015/0358290 A1* | 12/2015 | Jain | H04L 63/0263 711/108 |

FOREIGN PATENT DOCUMENTS

JP 2014-230057 A 12/2014

OTHER PUBLICATIONS

Mahalingam, et al., "Virtual Extensible Local Area Network (VXLAN): A Framework for Overlaying Virtualized Layer 2 Networks over Layer 3 Networks", ISSN: 2070-1721, Published in Aug. 2014.

Lasserre, et al., "Framework for Data Center (DC) Network Virtualization" ISSN: 2070-1721, Published in Oct. 2014.

* cited by examiner

*Primary Examiner* — Mohamed Kamara
(74) *Attorney, Agent, or Firm* — Mattingly & Malur, PC

(57) ABSTRACT

A virtual tunnel endpoint that makes a communication of a specific tenant is separated from virtual tunnel endpoints that make communications of the other tenants. A forwarding route from the virtual tunnel endpoint that makes a communication of the specific tenant is separated from a forwarding route from the virtual tunnel endpoints that make communications of the other tenants. Accordingly, a communication of the specific tenant is forwarded with priority.

8 Claims, 16 Drawing Sheets

FIG. 4

| VTEP | VNI | PORT NUMBER | VLAN ID |
|---|---|---|---|
| VTEP11 | 1 | IF11 | 101 |
| VTEP12 | 2 | IF12 | 201 |
| VTEP12 | 3 | IF12 | 202 |

FIG. 5

| VNI | MAC ADDRESS | OUTPUT INTERFACE | | |
|---|---|---|---|---|
| | | NETWORK SIDE | ACCESS SIDE | |
| | | DESTINATION IP ADDRESS OF VTEP | PORT NUMBER | VLAN ID |
| 1 | MAC-A | - | IF11 | 101 |
| 1 | MAC-D | IP-21 | - | - |
| 2 | MAC-B | - | IF12 | 201 |
| 2 | MAC-E | IP-22 | - | - |
| 3 | MAC-C | - | IF12 | 202 |
| 3 | MAC-F | IP-22 | - | - |

FIG. 6

| NETWORK TYPE | VTEP | TUNNEL COMMUNICATION PATH | SOURCE IP ADDRESS | DESTINATION IP ADDRESS | TUNNEL GUARANTEED BANDWIDTH | QoS PRIORITY |
|---|---|---|---|---|---|---|
| BANDWIDTH GUARANTEE | VTEP11 | TL1 | IP-11 | IP-21 | 5Gbps | 6 |
| BEST EFFORT | VTEP12 | TL2 | IP-12 | IP-22 | - | 1 |

| DESTINATION ROUTE | OUTPUT INTERFACE | | |
|---|---|---|---|
| | PRIORITY ORDER | Next hop ADDRESS | OUTPUT PORT NUMBER |
| IP-21 | 1 | IP-A | IF13 |
| | 2 | IP-B | IF14 |
| IP-22 | 1 | IP-B | IF14 |
| IP-11 | 1 | TO ITS OWN APPARATUS | |
| IP-12 | 1 | TO ITS OWN APPARATUS | |

| TUNNEL COMMUNICATION PATH | NETWORK TYPE | VTEPS AT BOTH ENDS OF TUNNEL | | TUNNEL GUARANTEED BANDWIDTH | QoS PRIORITY | USER |
|---|---|---|---|---|---|---|
| | | VTEP | IP ADDRESS | | | |
| TL1 | BANDWIDTH GUARANTEE | VTEP11 | IP-11 | 5Gbps | 6 | USER A |
| | | VTEP21 | IP-21 | | | |
| TL2 | BEST EFFORT | VTEP12 | IP-12 | – | 1 | USER B USER C |
| | | VTEP22 | IP-22 | | | |

FIG. 9

| PACKET RELAY APPARATUS | NETWORK TYPE | VTEP | VNI | PORT NUMBER | VLAN ID | USER |
|---|---|---|---|---|---|---|
| 101 | BANDWIDTH GUARANTEE | VTEP11 | 1 | IF11 | 101 | USER A |
| | BEST EFFORT | VTEP12 | 2 | IF12 | 201 | USER B |
| | | | 3 | IF12 | 202 | USER C |
| 102 | BANDWIDTH GUARANTEE | VTEP21 | 1 | IF21 | 101 | USER A |
| | BEST EFFORT | VTEP22 | 2 | IF22 | 201 | USER B |
| | | | 3 | IF22 | 202 | USER C |

COMMUNICATION APPARATUS AND COMMUNICATION METHOD

BACKGROUND OF THE INVENTION

1. Field of the Invention

The present invention relates to a communication apparatus or a communication method between the communication apparatuses.

2. Description of the Related Art

In recent years, the need for the virtualization of a network is increasing for a network infrastructure with the evolution of the virtualization of a server. It is necessary to connect multiple virtual machines in a data center, further accommodate tenants of multiple client systems in the same infrastructure, and disable communication between the tenants. In order to provide flexibility to the placement and operation of resources of the virtual machines, a large-scale Layer 2 network is to be assigned to each tenant. If a large-scale Layer 2 network is constructed between remote locations such as between data centers, a Layer 3 network may be interposed. In order to deal with this request, there are overlay technologies that stretch Layer 2 networks via Layer 3 networks.

IETF RFC7348 "Virtual eXtensible Local Area Network (VXLAN): A Framework for Overlaying Virtualized Layer 2 Networks over Layer 3 Networks", ISSN: 2070-1721 Published in August 2014 discloses the VXLAN technology that realizes a Layer 2 multitenant environment of approximately 16 million on a Layer 3 network. According to the technology described in IETF RFC7348 "Virtual eXtensible Local Area Network (VXLAN): A Framework for Overlaying Virtualized Layer 2 Networks over Layer 3 Networks", ISSN: 2070-1721 Published in August 2014, one virtual tunnel endpoint (VTEP) is provided to a virtual switch or the like in each physical server. The VTEP encapsulates a layer 2 frame in a Layer 3 packet, and transmits the encapsulated packet to a VTEP to which a destination virtual machine belongs. Upon the encapsulation, a virtual network identifier (VNI) identifying a tenant is added in the packet. The VTEP that has received the packet determines a forwarding destination after decapsulation from the VNI and a destination MAC address of the inner layer 2 frame, and forwards the packet or discards it if there is no destination. A Layer 3 IP address is used for forwarding. Accordingly, Layer 3 ECMP (Equal Cost Multipath) may be used to extend a bandwidth. A source IP address and a destination IP address of an IP header to be encapsulated are the same. Therefore, in order to make effective use of Layer 3 ECMP when communication is carried out between specific VTEPs, it is recommended to have a source port number of an UDP header being a hash of the inner Ethernet frame's header.

IETF RFC7365 "Framework for Data Center (DC) Network Virtualization" ISSN: 2070-1721, Published on October 2014 describes a framework for data center network virtualization over a Layer 3 network. According to the framework described in IETF RFC7348 "Virtual eXtensible Local Area Network (VXLAN): A Framework for Overlaying Virtualized Layer 2 Networks over Layer 3 Networks", ISSN: 2070-1721 Published in August 2014, a method that connects tenant systems to VNIs is described. There is a VTEP in a packet relay apparatus such as a virtual switch or physical switch, and there is a VNI belonging to the VTEP. A virtual access point that connects the VNI to a tenant system is, for example, an interface identifier connected to a physical port or VLAN of a physical switch, or a virtual machine of a virtual switch.

JP-A-2014-230057 discloses a technology that selects communication on a network corresponding to a specific quality of service (QoS) from a plurality of networks with different QoSs in communication between virtual machines. When L2 over L3 tunneling communication is carried out between virtual machines operating on different physical servers, there is a plurality of networks with different QoSs between the physical servers. When a first virtual machine makes a communication addressed to a second virtual machine, used is an IP address of a physical network that supports a specific QoS for an IP address of an L3 packet of when an L2 frame is encapsulated in the L3 packet.

SUMMARY OF THE INVENTION

In the background art, one virtual tunnel endpoint is provided in a packet relay mechanism, such as a virtual switch, physical switch, or router in a physical server, that tunnels L2 over L3. One source IP address of a tunnel is set at the virtual tunnel endpoint. When a Layer 2 frame is encapsulated in a Layer 3 packet to forward the packet between specific VTEPs, the source IP address and the destination IP address are the same. Even if there are two or more communication routes on a network that does not use ECMP/load balancing, it is unbalanced to one communication route. The use of ECMP between specific VTEPs makes it possible to spread load across two or more communication routes. However, communications of all the tenants are encapsulated with the same source IP address and destination IP address. Accordingly, it is not possible to perform forwarding after implementing bandwidth guarantee and priority control on a communication of a specific tenant.

In the background art, the packet relay mechanism that tunnels L2 over L3 uses a VLAN or physical port to identify a virtual access point that connects a VNI to a tenant system. However, if the same VLAN ID is already used by different tenants, either of them needs to change the VLAN ID. Layer 2 forwarding cannot be performed between different VLANs in the same tenant.

In the technology described in JP-A-2014-230057, it is possible to select a physical network that supports the QoS between packet relay mechanisms that tunnel L2 over L3. However, a network is selected in a fixed manner. Accordingly, it is not possible to dynamically change a forwarding route upon a network failure and congestion.

One aspect of the present invention to solve at least one of the above problems is a packet communication method between a first communication apparatus that accommodates terminals connected via a plurality of first Layer 2 networks, and a second communication apparatus that accommodates terminals connected via a plurality of second Layer 2 networks, and includes the following:

Each of the first and second communication apparatuses uses a different IP address for each virtual tunnel endpoint (VTEP) to create tunnel routes respectively in a plurality of Layer 3 networks, and sets a virtual network identifier (VNI) for a VLAN corresponding to each first layer 2 network. The first communication apparatus receives a Layer 2 frame from the first Layer 2 network, encapsulates the layer 2 frame in a Layer 3 packet based on an association of the VLAN, the VNI, and the VTEP, and transmits the encapsulated packet to a tunnel route. Moreover, the first communication apparatus assigns one VNI to a VTEP corresponding to a first tunnel route, occupies a bandwidth of a first Layer 3 network creating the first tunnel route for a communication of a terminal belonging to the one VNI, assigns a plurality of VNIs to a VTEP corresponding to a second tunnel route, and shares a bandwidth of a second Layer 3 network creating the second tunnel route for communications of terminals belonging to the plurality of VNIs. Moreover, when detecting an abnormality on the first tunnel route, the first communication apparatus shares the bandwidth of the second Layer 3 network, and makes a communication of a terminal belonging to a VNI assigned to a VTEP supporting the first and second tunnel routes. Moreover, the Layer 2 frame is a frame in accordance with a protocol stipulated in Layer 2 based on the OSI reference model, and includes a destination address of the frame, for example, a MAC address. The Layer 3 packet is a frame in accordance with a protocol stipulated in Layer 2 based on the OSI reference model, and includes an address of a destination of the packet in accordance with a protocol stipulated in Layer 3, for example, and IP address.

According to the present invention, in a virtual network system, flexible routing control and bandwidth guarantee can be implemented. Moreover, it becomes possible to forward packets by giving priority to or guaranteeing a bandwidth for communication of a specific tenant among a plurality of tenants that communicates between the same packet relay apparatuses. Problems, configurations, and effects other than those described above will be clear from the following description of embodiments.

BRIEF DESCRIPTION OF THE DRAWINGS

FIG. 4 is an explanatory diagram of a virtual network/ mapping information table.

FIG. 5 is an explanatory diagram of a MAC address table.

FIG. 6 is an explanatory diagram of a tunnel information table.

FIG. 7 is an explanatory diagram of a routing table.

FIG. 8 is an explanatory diagram of a virtual network/ mapping information management table.

FIG. 9 is an explanatory diagram of a tunnel information management table.

DESCRIPTION OF THE PREFERRED EMBODIMENTS

Figure 1:
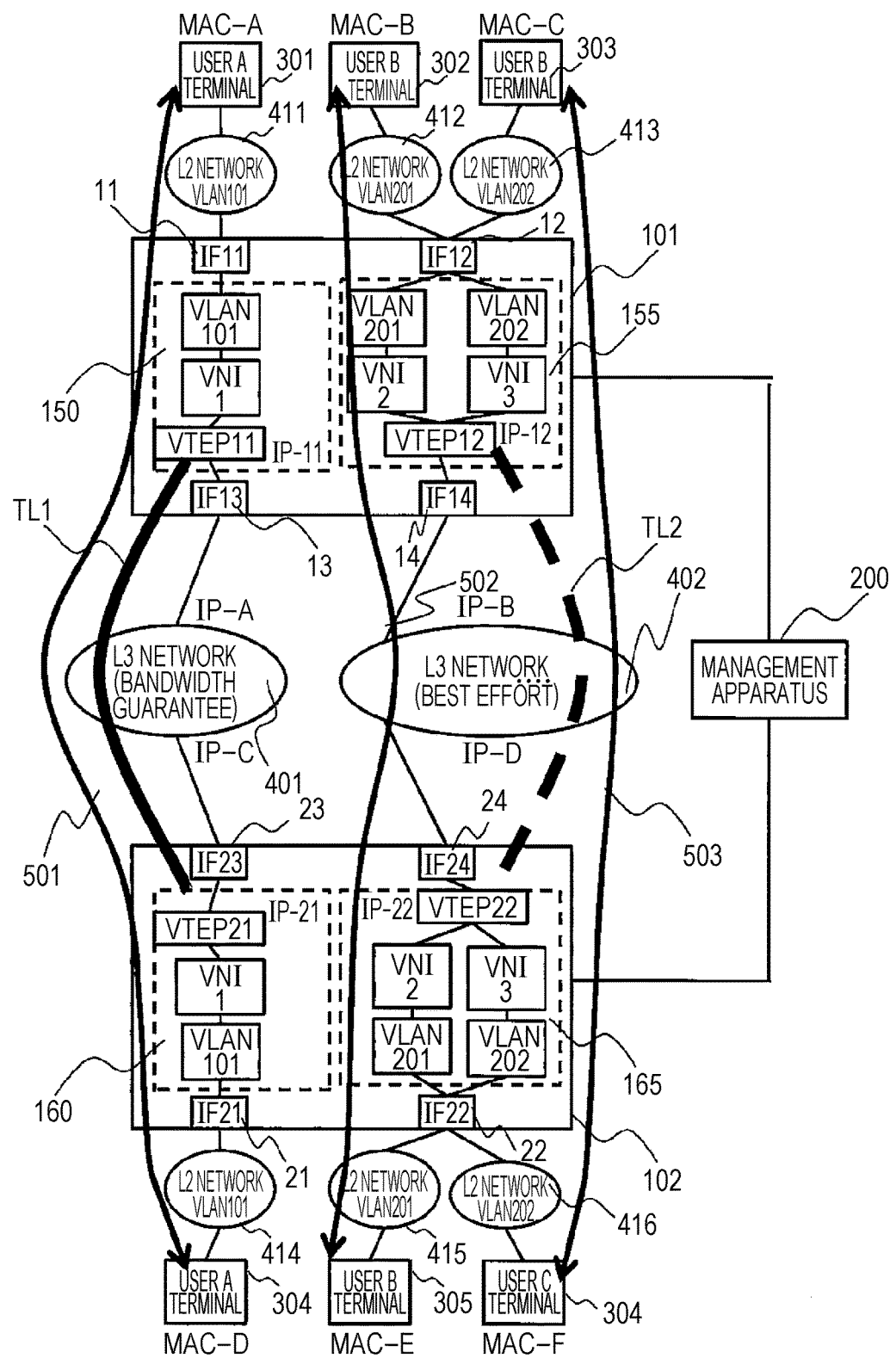
FIG. 1 is an explanatory diagram of a virtual network system configuration.

Embodiments of the present invention are described hereinafter using examples with reference to the drawings. The same reference signs are assigned to substantially the same portions, and their descriptions are not repeated.

Firstly, the configuration of a virtual network system is described with reference to FIG. 1. A packet relay apparatus 101 is connected to an L3 network (bandwidth guarantee) 401 via a physical port IF 13, to an L3 network (best effort) 402 via a physical port IF 14, to an L2 network 411 of a VLAN 101 (VLAN with an ID 101) via a physical port IF 11, and to an L2 network 412 of a VLAN 201 (VLAN with an ID 201) and an L2 network 413 of a VLAN 202 (VLAN with an ID 202) via a physical port IF 12. The physical ports IF 11 and IF 12, and physical ports IF 21 and IF 22 connected to the L2 networks 411 and 412, and L2 networks 413 to 416 are defined as an access side. The physical ports IF 13 and IF 14, and physical ports IF 23 and IF 24 connected to the L3 networks 401 and 402 are defined as a network side.

A packet relay apparatus 102 is connected to the L3 network (bandwidth guarantee) 401 via the physical port IF 23, to the L3 network (best effort) 402 via the physical port IF 24, to the L2 network 414 of the VLAN 101 via the physical port IF 21, and to the L2 network 415 of the VLAN 201 and the L2 network 416 of the VLAN 202 via the physical port IF 22.

A user A terminal 301 has a MAC address, MAC-A, and is connected to the L2 network 411. A user B terminal 302 has a MAC address, MAC-B, and is connected to the L2 network 412. A user C terminal 303 has a MAC address, MAC-C, and is connected to the L2 network 413. A user A terminal 304 has a MAC address, MAC-D, and is connected to the L2 network 414. A user B terminal 305 has a MAC address, MAC-E, and is connected to the L2 network 415. A user C terminal 306 has a MAC address, MAC-F, and is connected to the L2 network 416. In FIG. 1, the packet relay apparatuses 101 and 102 use the VXLAN (Virtual Extended LAN) protocol to communicate between terminals via a L3 network of the same user terminals (for example, the user A terminals 301 and 304).

A management apparatus 200 is connected to the packet relay apparatuses 101 and 102 and the L3 networks 401 and 402. The management apparatus 200 manages configuration information related to the L3 networks and transmits it to the packet relay apparatuses 101 and 102.

A Nexthop address from the packet relay apparatus 101 to the L3 network 401 is IP-A, and a Nexthop address from the packet relay apparatus 101 to the L3 network 402 is IP-B. A Nexthop address from the packet relay apparatus 102 to the L3 network 401 is IP-C, and a Nexthop address from the packet relay apparatus 102 to the L3 network 402 is IP-D.

A plurality of virtual tunnel endpoints VTEP 11 (VTEP with an ID 11) and VTEP 12 (VTEP with an ID 12) are set for the packet relay apparatus 101. In FIG. 1, IP 11 is assigned to an IP address of the VTEP 11, and IP-12 to an IP address of the VTEP 12. A plurality of virtual tunnel endpoints VTEP 21 (VTEP with an ID 21) and VTEP 22 (VTEP with an ID 22) are set also for the packet relay apparatus 102. IP 21 is assigned to an IP address of the VTEP 21, and IP-22 to an IP address of the VTEP 22.

Routing information of the packet relay apparatuses 101 and 102 is set in such a manner as that a tunnel route 501 between the VTEP 11 and the VTEP 21, which is created by being connected through a tunnel between the VTEP 11 and the VTEP 21, uses the L3 network (bandwidth guarantee) 401 with first priority and the L3 network (best effort) with second priority. Routing information of the packet relay apparatuses 101 and 102 is set in such a manner as that a tunnel route 502 between the VTEP 12 and the VTEP 22, which is created by being connected through a tunnel between the VTEP 12 and the VTEP 22 uses only the L3 network (best effort) 402.

In terms of Layer 2 forwarding between the user A terminal 301 and the user A terminal 304, settings related to VXLANs corresponding to mappings illustrated in FIG. 1 are made in the packet relay apparatuses 101 and 102 to perform forwarding between the packet relay apparatuses 101 and 102 via the L3 network (bandwidth guarantee) 401. In the packet relay apparatus 101, the VLAN 101 to which the user A terminal 301 belongs is mapped to a VNI (virtual network interface identifier) 1, and the VNI 1 to the VTEP 11 as illustrated in a mapping 150. In the packet relay apparatus 102, the VLAN 101 to which the terminal 304 belongs is mapped to the VNI 1 and the VNI 1 to the VTEP 21 as illustrated in a mapping 160.

In terms of Layer 2 forwarding between the user B terminal 302 and terminal 305, settings related to VXLANs corresponding to mappings illustrated in FIG. 1 are made in the packet relay apparatuses 101 and 102 to perform forwarding between the packet relay apparatuses 101 and 102 via the L3 network (best effort) 402. In the packet relay apparatus 101, the VLAN 201 to which the user B terminal 302 belongs is mapped to a VNI 2, and the VNI 2 to the VTEP 12 as illustrated in a mapping 155. In the packet relay apparatus 102, the VLAN 201 to which the terminal 305 belongs is mapped to the VNI 2 and the VNI 2 to the VTEP 22 as illustrated in a mapping 165.

In terms of Layer 2 forwarding between the user B terminal 303 and terminal 306, settings related to VXLANs corresponding to the mappings illustrated in FIG. 1 are made in the packet relay apparatuses 101 and 102 to perform forwarding between the packet relay apparatuses 101 and 102 via the L3 network (best effort) 402. In the packet relay apparatus 101, the VLAN 202 to which the user B terminal 303 belongs is mapped to a VNI 3 as illustrated in the mapping 155. The VNI 3 is mapped to the VTEP 12. In the packet relay apparatus 102, the VLAN 202 to which the terminal 306 belongs is mapped to the VNI 3, and the VNI 3 to the VTEP 22 as illustrated in the mapping 165.

In the packet relay apparatus 101 or 102, a Layer 2 frame received from a L2 network is encapsulated inside a Layer 3 packet in accordance with the VXLAN protocol, and forwarded to a bandwidth-guaranteed or best-effort L3 network corresponding to a user terminal on the L2 network. The packet relay apparatus 101 or 102, which has received the packet, performs decapsulation and forwards the packet to an applicable L2 network connected to itself.

As describe above, the L3 network (bandwidth guarantee) 401 is used only for communications between the user A terminal 301 and terminal 304, which are desired to give a priority to. The L3 network (best effort) 402 is used for communications between the other terminals.

Not on a user terminal basis, but also if tenants connected to L2 networks communicate via L3 networks in accordance with the VXLAN protocol, communications in a specific tenant may be made via the L3 network (bandwidth guarantee) 401, and communications in the other tenants may be made via the L3 network (best effort) 402. Moreover, there may be a plurality of the L3 networks (best effort) 402. Each L3 network (best effort) 402 may be assigned a different VTEP and a different IP address. A tenant system 601 and a tenant system 602 are separate systems. However, even if the VLANs 101 and 102 are already used with the same VLAN-IDs, a different VNI and VTEP are assigned to each tenant system, and communication routes are allocated in the L3 network.

A user (tenant) specific communication route in a virtual network system is described. Layer 2 forwarding between the user A terminal 301 and the user A terminal 304 uses the communication route 501. A relay process of Layer 2 forwarding from the user A terminal 301 to the user A terminal 304 is described. When the packet relay apparatus 101 receives a Layer 2 frame of the VLAN 101, the Layer 2 frame is encapsulated in an IP header with a source IP address, IP-11, and a destination IP address, IP-21, at the virtual tunnel endpoint VTEP 11 to which the virtual network identifier VNI 1 of the VLAN 101 belongs. The virtual network identifier VNI 1 is assigned to the packet. A tunnel communication path TL 1 is used to forward the packet. The packet relay apparatus 102 decapsulates the received packet, and forwards the packet to the VLAN 101 mapped to the virtual network identifier VNI 1. The user A terminal 304 receives the packet.

Layer 2 forwarding between the user B terminal 302 and the user B terminal 305 uses the communication route 502. A relay process of Layer 2 forwarding from the user B terminal 302 to the user B terminal 305 is described. When the packet relay apparatus 101 receives a Layer 2 frame of the VLAN 201, the Layer 2 frame is encapsulated in an IP header with a source IP address, IP-12, and a destination IP address, IP-22, at the virtual tunnel endpoint VTEP 12 to which the virtual network identifier VNI 2 of the VLAN 201 belongs. The virtual network identifier VNI 2 is assigned to the packet. A tunnel communication path TL 2 is used to forward the packet. The packet relay apparatus 102 decapsulates the received packet, and forwards the packet to the VLAN 201 mapped to the virtual network identifier VNI 2. The use B terminal 305 receives the packet.

Layer 2 forwarding between the user C terminal 303 and the user C terminal 306 uses a communication route 503. A relay process of Layer 2 forwarding from the user C terminal 303 to the user C terminal 306 is described. When the packet relay apparatus 101 receives a Layer 2 frame of the VLAN 202, the Layer 2 frame is encapsulated in an IP header with a source IP address, IP-12, and a destination IP address, IP-22, at the virtual tunnel endpoint VTEP 12 to which the virtual network identifier VNI 3 of the VLAN 202 belongs. The virtual network identifier VNI 3 is assigned to the packet. The tunnel communication path TL 2 is used to forward the packet. The packet relay apparatus 102 decapsulates the received packet, and forwards the packet to the VLAN 202 mapped to the virtual network identifier VNI 3. The use C terminal 306 receives the packet.

As described above, each packet relay apparatus (101, 102) connected via a plurality of Layer 3 networks (401, 402) created in accordance with the routing protocol encapsulates, inside a Layer 3 packet, a Layer 2 frame transmitted from a terminal apparatus accommodated in the packet relay apparatus belonging to a VLAN, and transmits it to a terminal apparatus belonging to the same VLAN, which is connected to an opposed packet relay apparatus (102, 101) via any of the Layer 3 networks. Communication on a Layer 3 network between the packet relay apparatus 101 and the packet relay apparatus 102 is carried out using virtual tunnel endpoints associated with separate source IP addresses.

Specifically, a tunnel 1 connected between a first tunnel endpoint in the packet relay apparatus 101 and a first tunnel endpoint in the second packet relay apparatus 102, and a tunnel 2 connected between a second tunnel endpoint in the first packet relay apparatus and a second tunnel endpoint in the second packet relay apparatus take separate routes on Layer 3 networks set in accordance with routing protocols.

With a communication system including the packet replay apparatuses 101 and 102, one of the routes is occupied by a communication between certain user terminals and the other route is shared by a plurality of communications between user terminals.

Figure 2:
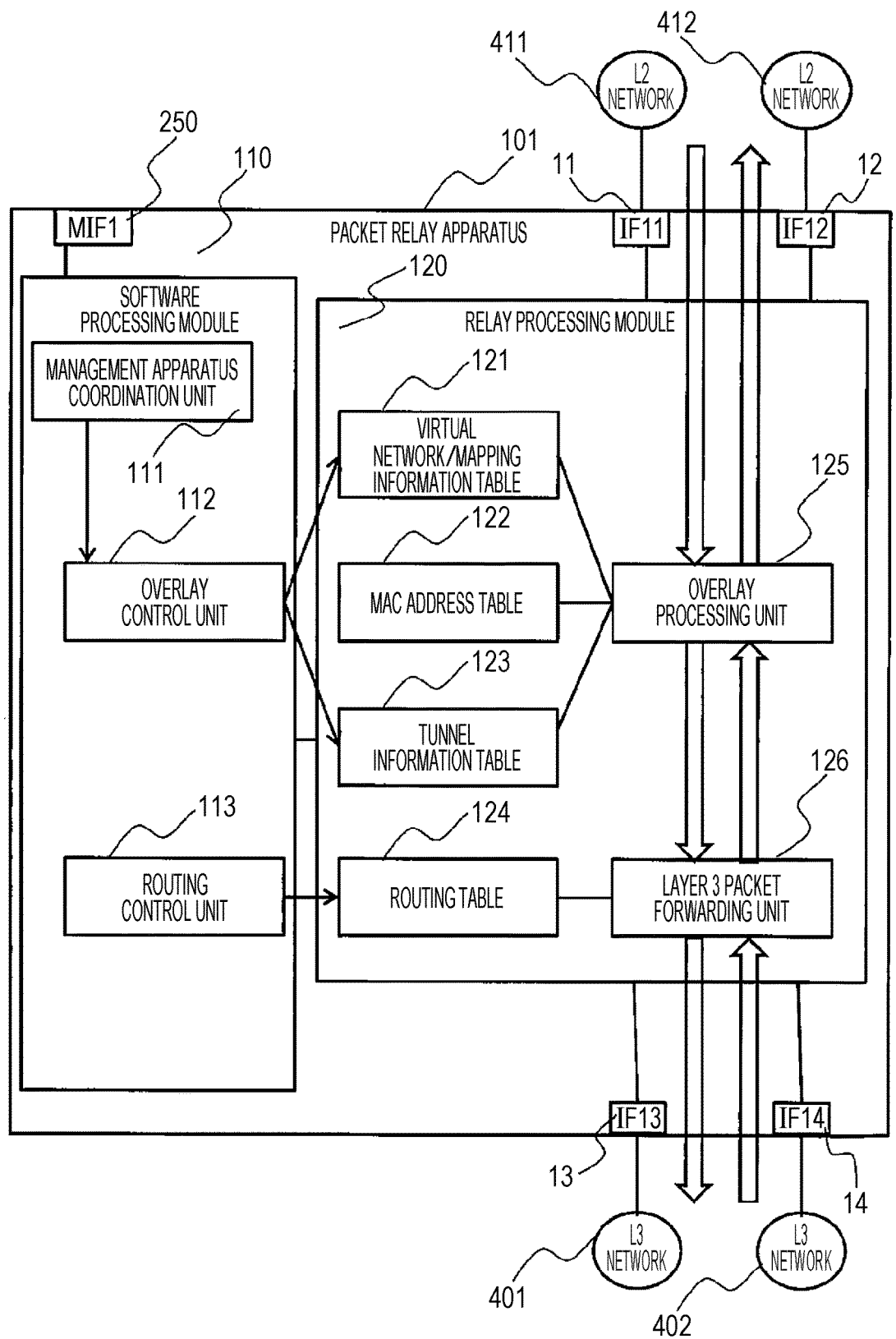
FIG. 2 is an apparatus configuration diagram of a packet relay apparatus.

An apparatus configuration diagram of the packet relay apparatus 101 is described with reference to FIG. 2. The apparatus configuration of the packet relay apparatus 102 is similar to the apparatus configuration of the packet relay apparatus described in FIG. 2 unless otherwise specified.

The packet relay apparatus 101 is a communication apparatus including a software processing module 110, a relay processing module 120, a management purpose port (MIF) 250, and the packet forwarding purpose physical ports IF 11, IF 12, IF 13, and IF 14.

The software processing module 110 is a processor that is connected to the management purpose port 250, includes functional blocks of a management apparatus coordination unit 111, an overlay control unit 112, and a routing control unit 113, and performs a software process. Moreover, the software processing module is connected to the relay processing module 120, and sets and updates information held in the relay processing module 120. The management apparatus coordination unit 111, the overlay control unit 112, and the routing control unit 113 are executed by the processor reading a program held in a nonvolatile memory or external storage device of the packet relay apparatus 101. The program may be distributed from the management apparatus 200. An instruction may be input into the software processing module with an external console or output to the console.

The management apparatus coordination unit 111 receives information related to a virtual network/mapping information table 121 and a tunnel information table 123 from the management apparatus 200 via the management purpose port 250, and notifies it to the overlay control unit 112.

The virtual network/mapping information table 121 contains information indicating a mapping between a virtual tunnel endpoint VTEP and a virtual network identifier VNI, a virtual network identifier VNI, and a mapping of a combination of a virtual network identifier VNI, a port number that identifies a physical port, which is a virtual access interface, and a VLAN ID. Specifically, information indicating associations of the mappings 150, 155, 160, and 165 of FIG. 1 is held in the packet relay apparatuses 101 and 102.

The tunnel information table 123 makes an association with the type of network: the bandwidth guarantee type or best effort type, and holds an association of a tunnel communication path created by a L3 network for each VTEP, a source IP address and a destination IP address corresponding to each tunnel communication path, a tunnel guaranteed bandwidth, and QoS priority. In other words, information related to a VTEP for bandwidth guarantee that forwards a packet with priority to the L3 network 401 (bandwidth guarantee), and information related to a VTEP that forwards a packet to the L3 network (best effort) 402 is registered in the tunnel information table 123.

The overlay control unit 112 sets configuration information in the virtual network/mapping information table 121 and the tunnel information table 123. The overlay control unit 112 reflects information notified by the management apparatus coordination unit 111 in the virtual network/mapping information table 121 and the tunnel information table 123.

The routing control unit 113 creates and manages a routing table 124. The routing control unit 113 synthesizes information on static routing being a fixed route, and dynamic routing that transmits and receives routing information to and from another packet relay apparatus, for example, an adjacent packet relay apparatus to update the routing information, and reflects it in the routing table 124. Moreover, the routing control unit 113 manages the state of a route between the other packet relay apparatus and the L3 network, and detects whether or not a failure has occurred based on the reception or non-reception of a control frame of the routing protocol from the other packet relay apparatus via the L3 network 401, 402. The routing control unit 113 sets and updates, in the routing table 124, a route of a L3 network that is different from the route where the failure has occurred and can communicate.

The relay processing module 120 includes circuits of an overlay processing unit 125 and a Layer 3 packet forwarding unit 126 that perform a packet forwarding process, and a memory configuring the virtual network/mapping information table 121, a MAC address table 122, the tunnel information table 123, and the routing information table 124 for the packet forwarding process. The relay processing module is connected to the physical IFs 11, 12, 13, 14.

An association between a MAC address and an output interface is held for each virtual network identifier VNI in the MAC address table 122.

An output interface according to a destination route is set in the routing information table 124. Information related to the output interface includes a priority order of the destination route, a Nexthop address, and an output port number (physical IF).

The overlay processing unit 125 is a circuit that performs an L2 over L3 tunneling process based on information of the virtual network/mapping information table 121, the MAC address table 122, and the tunnel information table.

The overlay processing unit 125 encapsulates a Layer 2 frame received from the L2 network on the access side inside a Layer 3 packet, and transmits the packet to the Layer 3 packet forwarding unit 126. The overlay processing unit 125 decapsulates the encapsulated Layer 3 packet received from the Layer 3 packet forwarding unit 126.

The Layer 3 packet forwarding unit 126 is a circuit that refers to the routing table 124, determines a forwarding destination of a Layer 3 packet, and forwards the packet to the L3 network 401 (bandwidth guarantee) or the L3 network 402 (best effort).

Figure 3:
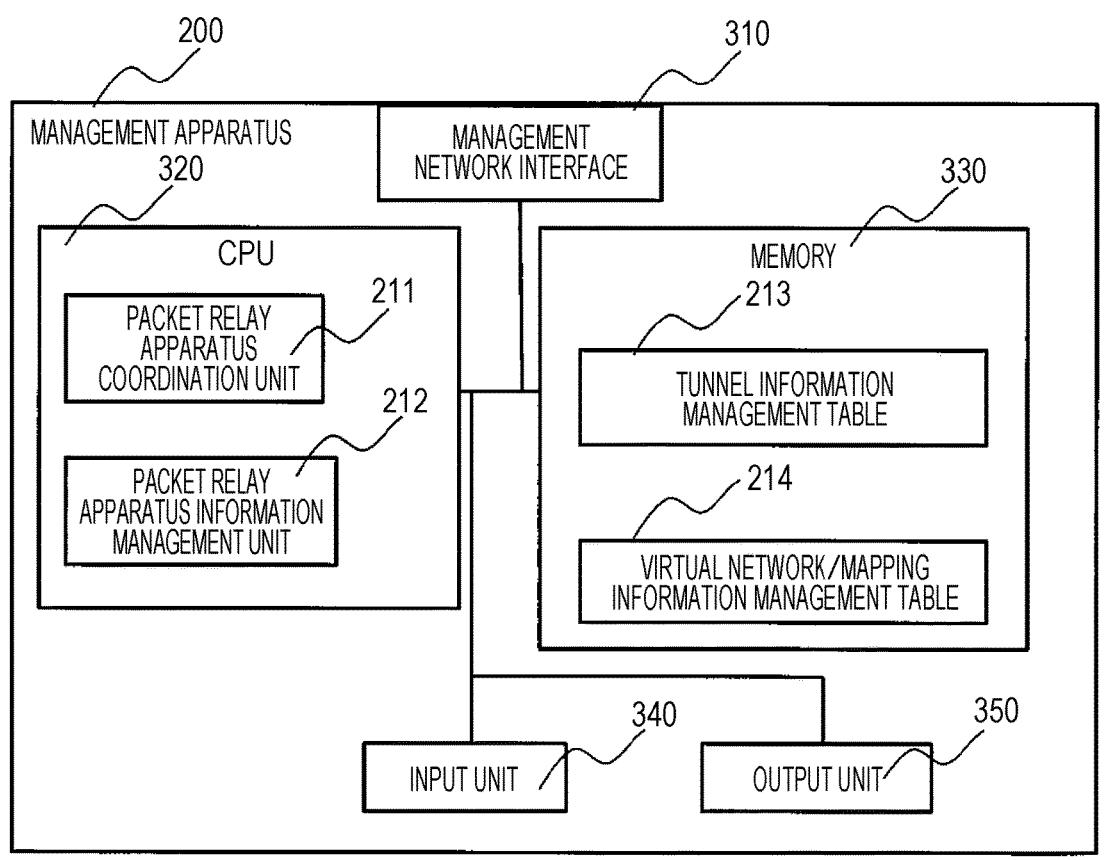
FIG. 3 is an apparatus configuration diagram of a management apparatus.

The apparatus configuration diagram of the management apparatus is described with reference to FIG. 3.

The management apparatus 200 is a calculating machine including a management network interface 310, a CPU 320, a memory 330, an input unit 340, and an output unit 350, which are interconnected.

The management network interface 310 is a port from which information related to packet relay is output to the relay apparatus 101, 102. The CPU 320 configures a packet relay apparatus coordination unit 211 and a packet relay apparatus information management unit 212 by reading a program as a program from a nonvolatile memory.

The memory 330 holds a tunnel information management table 213 and a virtual network/mapping information management table 214.

The packet relay apparatus coordination unit 211 is a functional block that distributes information related to the tunnel information table 123 and the virtual network/mapping information table created by the packet relay apparatus information management unit 212 respectively from the tunnel information management table 213 and the virtual network/mapping information management table 214, to the packet relay apparatus 101, 102 via the management network interface 310. A program realizing the functional block corresponding to the packet relay apparatus coordination unit 211 may be stored in a nonvolatile memory (not illustrated) of the management apparatus 200 or an external storage device (not illustrated) of the management apparatus 200.

The packet relay apparatus information management unit 212 is a functional block that manages the tunnel information management table 213 and the virtual network/mapping information management table 214, and generates the tunnel information table 123 and information to be stored in the virtual network/mapping information management table 214 from the tunnel information management table 213 based on setting information input via the input unit 340. A program to realize the functional block corresponding to the packet relay apparatus information management unit 212 may be stored in the nonvolatile memory (not illustrated) of the management apparatus 200 or the external storage device (not illustrated) of the management apparatus 200.

The input unit 340 is a module that receives, from the outside, instructions to the packet relay apparatus coordination unit 211 and the packet relay apparatus information management unit 212 to be executed by the CPU 320, and is, for example, a keyboard or a pointing device. The output unit 350 is an output unit device of information for displaying a prompt of an input to the input unit 340, and is, for example, a display. The input unit 340 and the output unit 350 may be a smartphone or tablet.

The virtual network/mapping information table is described with reference to FIG. 4.

The virtual network/mapping information table 121 is a table where a mapping of a virtual tunnel endpoint VTEP 410 and a virtual network identifier VNI 420, and a mapping of a combination of the virtual network identifier VNI 420, a port number 430 (an identifier of a physical IF) being a virtual access interface, and a VLAN ID 440 are set. The virtual network/mapping information table 121 is a table that is referred to when the overlay processing unit 125 performs the encapsulation process, the decapsulation, and the output to the access interface. Combinations to be stored in the virtual network/mapping information table 121 correspond to the mappings 150, 155, 160, and 165 of FIG. 1.

The MAC address table is described with reference to FIG. 5.

The MAC address table 122 is a table where an output interface of a MAC address learned for each virtual network identifier VNI is set. The MAC address table 122 is configured associating a virtual network identifier VNI 510, a MAC address 520, and an output interface 530. The output interface 530 includes an output interface on a network side 540 and an output interface on an access side 550. On the network side 540, an IP address of a destination VTEP upon encapsulation and output is set. On the access side 550, a port number and a VLAN ID for outputting a Layer 2 frame are set. When packets are transmitted and received, the MAC address table 122 is updated by the overlay control unit 125 learning. The MAC address table 122 is a table that is referred to when the overlay control unit 125 performs the encapsulation process, the decapsulation, and the output to an access interface.

The tunnel information table is described with reference to FIG. 6. A VTEP for bandwidth guarantee that forwards a packet with priority to the L3 network (bandwidth guarantee) and a VTEP 620 that forwards a packet to the L3 network (best effort) are registered in the tunnel information table 123. In terms of information accompanied with the VTEP, a tunnel communication path 630 connected to each VTEP, a source IP address 640 and a destination IP address 650 for encapsulation according to the tunnel communication path, a tunnel guaranteed bandwidth 660, and QoS priority 670 are set.

The tunnel guaranteed bandwidth 660 is a bandwidth that is guaranteed when an encapsulated packet is output, and is set for a VTEP whose network type 610 is associated with bandwidth guarantee, and is not set for a VTEP whose network type 610 is associated with best effort. The QoS priority 670 is priority for the time an encapsulated packet is output to the L3 network. Priority is given to one having a higher priority value upon forwarding. In FIG. 6, the priority of the VTEP for bandwidth guarantee is six, the setting of which is higher than the VTEP for best effort having a priority value of one. When the tunnel communication path of the VTEP for bandwidth guarantee is changed from the L3 network (bandwidth guarantee) 401 to the L3 network (best effort) 402, the packet relay apparatus 101 gives a higher priority to a packet transmitted from the VTEP for bandwidth guarantee than a packet transmitted from the VTEP for best effort to output the packet.

The tunnel information table 123 is a table that is referred to when the overlay processing unit 125 performs the encapsulation process, the decapsulation, and the output to an output interface.

The routing table is described with reference to FIG. 7.

An output interface 720 of each destination route 710 is set in the routing table 124. A priority order 730, a Nexthop address 740, and an output port number 750 (identifier identifying a physical IF to output) are set in the output interface 720. If a plurality of candidates for the output interface is associated with one destination route 710, a different priority order is set for each candidate for the output interface 720. The Layer 3 packet forwarding unit 126 selects a Next hop address and output port number that is highest in priority order when searching for a routing for the destination route 710 associated with the plurality of candidates for the output interface. When a failure occurs in an output interface that is highest in priority order, the routing control unit 113 updates the priority order 730 to set such that an output interface with the second highest priority becomes highest in priority order. The touring table 124 is a table that is referred to by the Layer 3 packet forwarding unit 126 for routing search.

The tunnel information management table 213 is described with reference to FIG. 8. A network type 820, a virtual tunnel endpoint 830 at both ends of a tunnel and an IP address 835 of the VTEP, a tunnel guaranteed bandwidth 840, QoS priority 850, and a user name (tenant name) 860 who uses the tunnel are set for each tunnel communication path 810 in the tunnel information management table 213.

In the bandwidth guaranteed tunnel communication path TL 1 indicated as TL 1 in the tunnel communication path 810 and as bandwidth guarantee in the network type 820, only a user A is set in the field of the user name 860 for use by a single user. 5 Gbps is set in the tunnel guaranteed bandwidth 840, and a value indicating a higher priority than the QoS priority of the other tunnel path is set in the QoS priority 850.

The best-effort TL 2 indicated as TL 2 in the tunnel communication path 810 and as best effort in the network type 820 is used by a plurality of users. Accordingly, users B and C are set in the field of the user name 860, associated with the tunnel communication path being TL 2 in the tunnel communication path 810. The tunnel communication path being TL 2 in the tunnel communication path 810 is associated. The field of the tunnel guaranteed bandwidth 840 has no setting. A QoS priority lower than the QoS priority of the tunnel communication path TL 1 is set in the field of the QoS priority 850. The field of the user name 860 simply requires information that identifies a user (tenant), and may indicate an identifier.

The virtual network/mapping information management table 214 is described with reference to FIG. 9.

The virtual network/mapping information management table 214 includes a network type 920, a VTEP 930, a VNI 940, a port number 950, a VLAN ID 960, and a user (tenant) 970, according to a packet relay apparatus 910.

A virtual network identifier VNI is set in the VNI 940, a port number of a relay apparatus to be used in the port number 905, and the assignment of a VLAN ID in the VLAN ID 960, according to the user indicated in the user 970 in the virtual network/mapping information management table 214. An identifier of a VTEP mapped to a VNI is set in the field of the VTEP 930. In terms of the identifier of the VTEP set in the VTEP 930, an identifier corresponding to a VTEP associated in advance with the network type in the field of the network type 920 is set according to the user.

Figure 10:
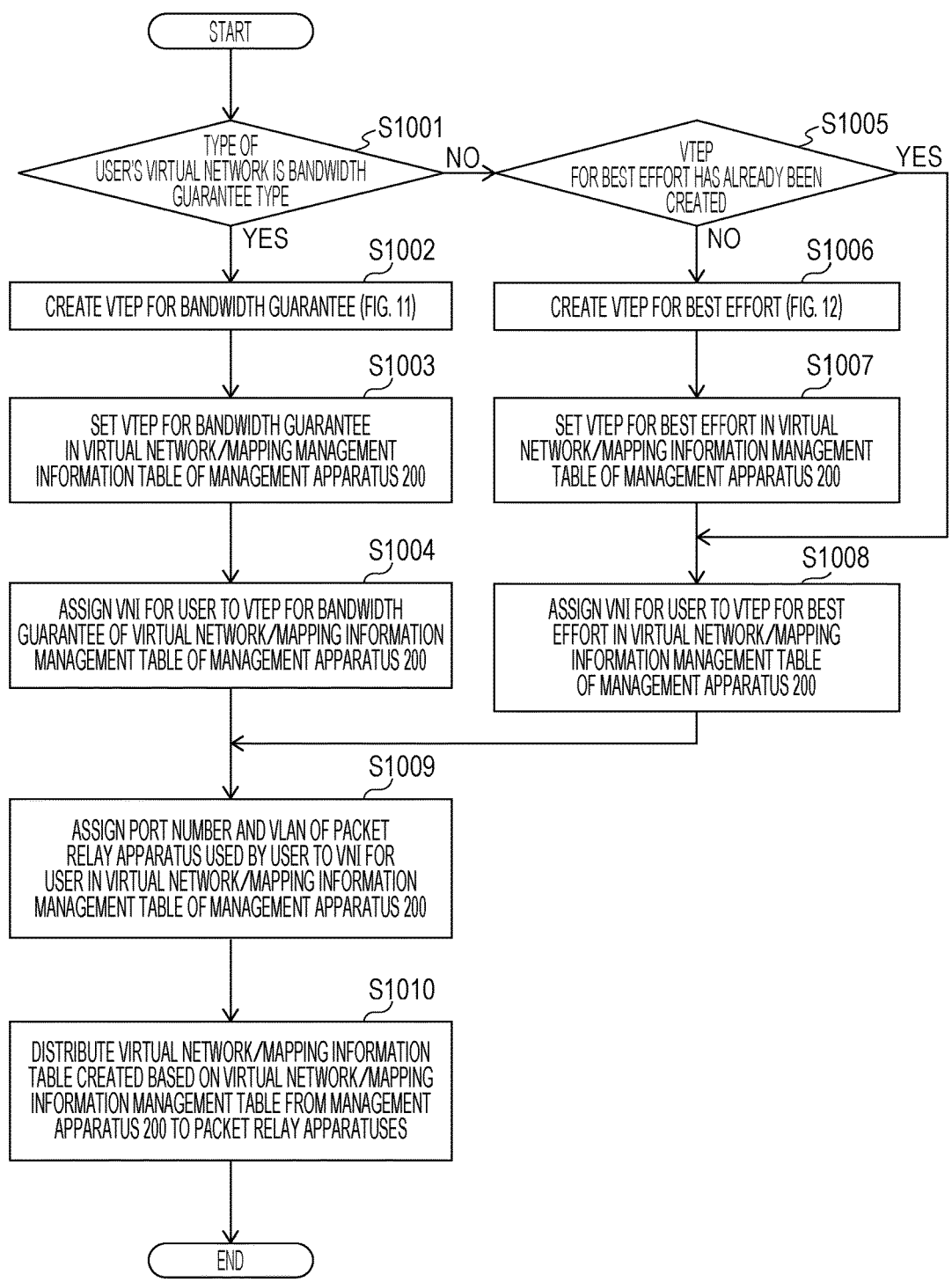
FIG. 10 is a flowchart of the setup of a virtual network for each user.

The flowchart of the setup of a virtual network for each user is described with reference to FIG. 10. In terms of the input of setting information for the tunnel information management table 213 and the virtual network/mapping information management table 214, a system administrator inputs information in the packet relay apparatus information management unit 212 via the input unit 340. The packet relay apparatus information management unit 212, which has received the information, reflects the settings in the tables.

The packet relay apparatus management unit 212 determines whether the type (class) of the user's virtual network input by the system administrator with the input operation is the bandwidth guarantee type or the best effort type (S1001).

If the type of the user's virtual network is the bandwidth guarantee type, the packet relay apparatus 101 and 102 create a VTEP for bandwidth guarantee (S1002). The details of S1002 are described in FIG. 11. The packet relay apparatus management unit 212 sets the VTEP for bandwidth guarantee in the virtual network/mapping information management table of the management apparatus 200 based on the input received by the system administrator with the input operation via the input unit 340 (S1003). When the packet relay apparatus management unit 212 has received, from the input unit 314, the information input by the system administrator with the input operation, the packet relay apparatus management unit 212 assigns a VNI to be assigned if the network type 920 of the virtual network/mapping information management table 214 is bandwidth guarantee, to the field of the VNI 940 associating the VNI with the VTEP whose network type 920 is bandwidth guarantee (S1004). In the example, the VNI is set to one for the VTEP set as bandwidth guarantee.

If the type of the user's virtual network is the best effort type, the packet relay apparatus management unit 212 refers to the virtual network/mapping information management table 214, and determines whether or not that a VTEP for best effort has already been created (S1005). If a VTEP for best effort has not been created, the packet relay apparatuses 101 and 102 input VTEP information by the system administrator with an input operation, and creates a VTEP for best effort (S1006). The details of S1006 are described in FIG. 11. The packet relay apparatus management unit 212 receives, from the input unit 314, the information input by the system administrator with an input operation. The packet relay apparatus management unit 212 sets the VTEP for best effort in the virtual network/mapping information management table 214 of the management apparatus 200 (S1007). If a VTEP for best effort has already been created in S1005, a VTEP is not created since the VTEP for best effort accommodates a plurality of users. After the setup of the VTEP for best effort, the packet relay apparatus management unit 212 receives, from the input unit 314, information input by the system administrator with an input operation. The packet relay apparatus management unit 212 assigns a VNI for the user to the VTEP for best effort of the virtual network/mapping information management table of the management apparatus 200 (S1008).

The following procedure is performed regardless of the type of the user's virtual network. The packet relay apparatus management unit 212 the packet relay apparatus management unit 212 assigns a port number and a VLAN of a packet relay apparatus, which are mapped to a VNI set in the virtual network/mapping information management table based on the information input by the system administrator with an input operation (S1009).

The packet relay apparatus management unit 212 distributes, to the packet relay apparatuses 101 and 102, mapping information managed by the virtual network/mapping information management table 214 set by the above steps via the packet relay apparatus coordination unit 211 and the management purpose IF 250 (S1010).

Specifically, the information distributed in S1010 contains a network type, VTEP, VNI, port number, VLAN ID, and information that identifies a user, which are associated with an identifier indicated in the field of the packet relay apparatus 910 illustrated in FIG. 9, according to the packet relay apparatus identified with the identifier. In terms of the distribution, the management apparatus 200 may transmit the pieces of information related to FIG. 8 all together to the plurality of packet relay apparatuses 101 and 102. Each of the packet relay apparatuses 101 and 102 may acquire mapping information corresponding to its own packet relay apparatus with the identifier of the packet relay apparatus contained in the information as the key. Moreover, the management apparatus 200 may select and transmit information to be distributed from the management network/mapping information management table 214 with the identifier of a packet relay apparatus as the key, for each of the packet relay apparatuses 101 and 102.

When the packet relay apparatuses 101 and 102 have received the information distributed from the management apparatus 200, the overlay control units 112 of the packet relay apparatuses 101 and 102 set the pieces of information distributed from the management apparatus via the management apparatus coordination units 111 in the VTEP 410, the VNI 420 the port number 430, and the VLAN ID 440 in the virtual network/mapping information table 121. With the above description, the packet relay apparatuses 101 and 102 assign a virtual network identifier to a VLAN corresponding to a user terminal accommodated in themselves at the instruction of the management apparatus, and causes the virtual network identifier to belong to a specific virtual tunnel endpoint.

Figure 11:
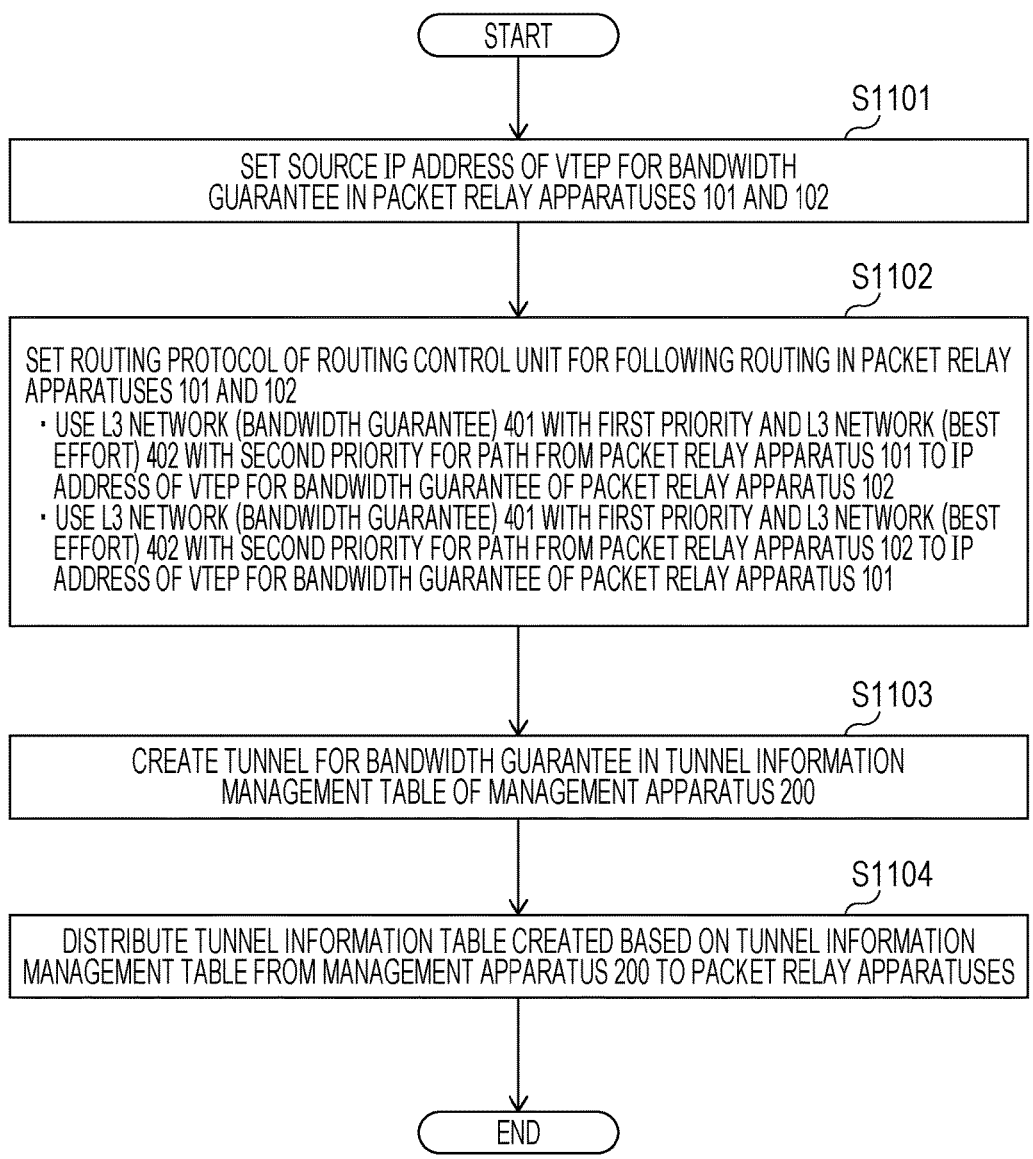
FIG. 11 is a flowchart of the creation of a virtual tunnel endpoint for bandwidth guarantee.

The flowchart of the creation of a virtual tunnel endpoint for bandwidth guarantee is described with reference to FIG. 11.

The overlay control units 112 set the "source IP address (IP-11)" of the VTEP for bandwidth guarantee in the destination route 710 and "to its own apparatus" in the output interface 720 in the packet relay apparatuses 101 and 102 into which the input was made by the system administrator with an input operation. (S1101). A routing protocol (routing table) of the routing control unit is set in the packet relay apparatuses 101 and 102 to have the following routings (S1102). With the input operation by the system administrator, the routing control unit 113 of the packet relay apparatus 101 sets such that the L3 network (bandwidth guarantee) 401 is used with first priority and the L3 network (best effort) 402 with second priority, for a route from the packet relay apparatus 101 to the IP address of the VTEP for bandwidth guarantee of the packet relay apparatus 102. The setup results are shown in the priority order 730, the Next hop address, and the output port number 750, which correspond to "IP-21" in the destination route 710 of the routing table 124 of FIG. 7. Similarly, with the input operation by the system administrator, the routing control unit 113 of the packet relay apparatus 102 sets such that the L3 network (bandwidth guarantee) 401 is used with first priority and the L3 network (best effort) 402 with second priority, for a route from the packet relay apparatus 102 to the IP address of the VTEP for bandwidth guarantee of the packet relay apparatus 101.

When the packet relay apparatus management unit 212 has received the information input by the system administrator with the input operation, the packet relay apparatus management unit 212 generates information on a tunnel for bandwidth guarantee in the tunnel information management table 213 of the management apparatus 200 (S1103). Specifically, the information on the tunnel for bandwidth guarantee generated in S1103 is a combination of a network type associated with TL 1 being the identifier of a tunnel communication path which is indicated in the field of the tunnel communication path 810 of FIG. 8, information (VTEPs and IP addresses) related to VTEPs at both ends of the tunnel, a tunnel guaranteed bandwidth, QoS priority, and information indicating a user. The packet relay apparatus management unit 212 distributes information related to a tunnel information table created based on the tunnel information management table from the management apparatus 200 to the packet relay apparatuses via the packet relay apparatus coordination unit 211 and the management purpose IF 250 (S1104).

The packet relay apparatuses 101 and 102 receive the pieces of information distributed from the management apparatus 200 in S1004. The overlay control units 112 of the packet relay apparatuses 101 and 102 set the identifier of the tunnel communication path in the tunnel communication path 630, and the information (VTEPs and IP addresses) related to the VTEPs at both ends of the tunnel in the VTEP 620, the source IP address 640, and the destination IP address, and also set the network type, the tunnel guaranteed bandwidth, and QoS priority, among the pieces of information distributed from the management apparatus via the management apparatus coordination 111.

Figure 12:
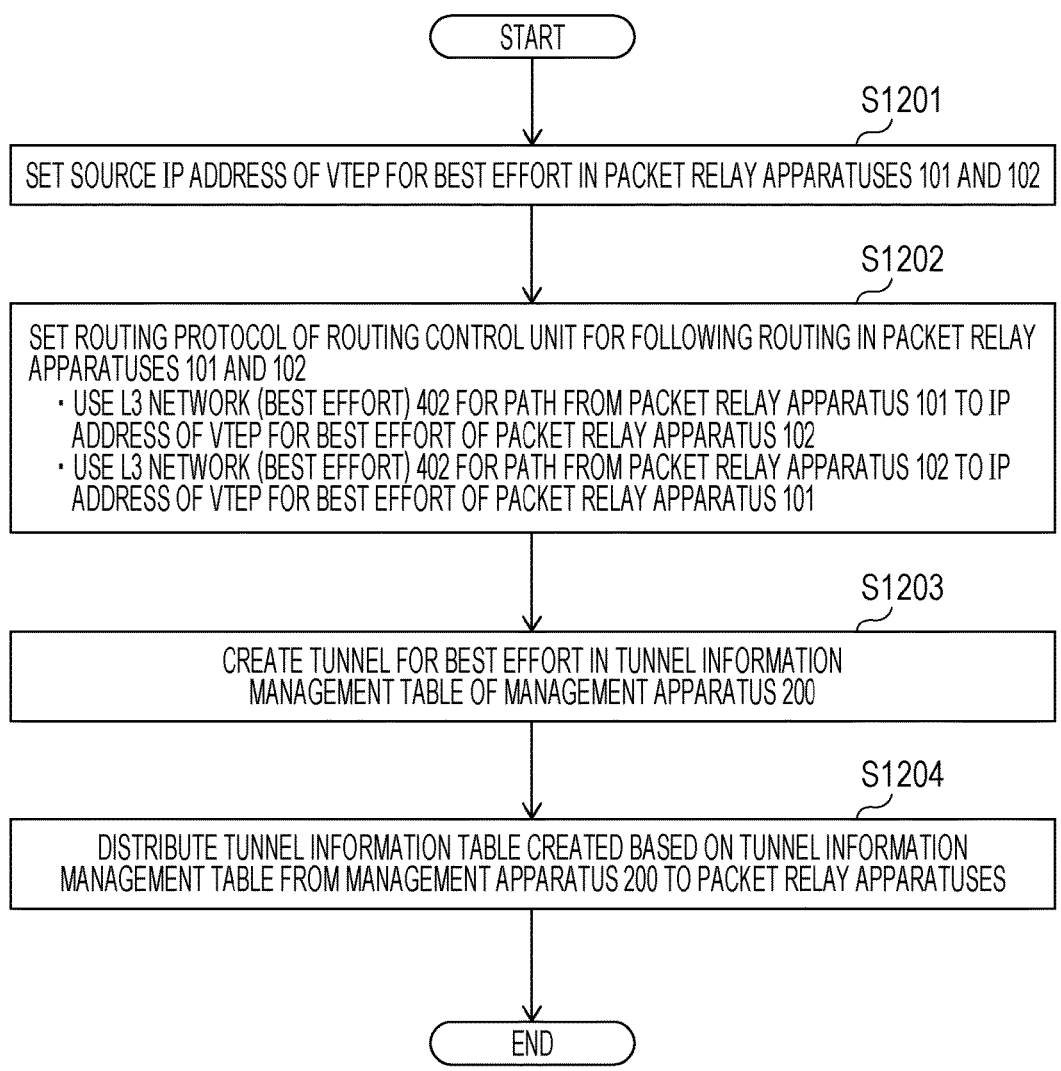
FIG. 12 is a flowchart of the creation of a virtual tunnel endpoint for best effort.

The flowchart of the creation of a virtual tunnel endpoint for best effort is described with reference to FIG. 12. The system administrator inputs a source IP address of a VTEP for best effort in the packet relay apparatuses 101 and 102 (S1201). The system administrator sets routing protocols of the routing control units to have the following routings in the packet relay apparatuses 101 and 102 (S1202).

With the input operation by the system administrator, the routing control unit 113 of the packet relay apparatus 101 sets in the routing table 124 such that the L3 network (best effort) 402 is used for a route from the packet relay apparatus 101 to an IP address of the VTEP for best effort of the packet relay apparatus 102. The setup results are shown in the priority order 730, the Next hop address, and the output port number 750, which correspond to "IP-22" in the destination route 710 of the routing table 124 of FIG. 7. Similarly, with the input operation by the system administrator, the routing control unit 113 of the packet relay apparatus 102 sets in the routing table 124 of the packet relay apparatus 102 such that the L3 network (best effort) 402 is used for a route from the packet relay apparatus 102 to an IP address of the VTEP for best effort of the packet relay apparatus 101. When the packet relay apparatus management unit 211 of the management apparatus 200 inputs information on a tunnel for best effort in the tunnel information management table 213 (S1203). Specifically, the information on the tunnel for best effort generated in S1203 is a combination of a network type associated with TL2 being the identifier of a tunnel communication path indicated in the field of the tunnel communication path 810 of FIG. 8, information (VTEPs and IP addresses) related to VTEPs at both ends of the tunnel, a tunnel guaranteed bandwidth (no setting), QoS priority, and information indicating a user.

The packet relay apparatus management unit 212 distributes information for the tunnel information table generated based on the tunnel information management table from the management apparatus 200 to the packet relay apparatuses via the packet relay apparatus coordination unit 211 and the management purpose IF 250 (S1204). The packet relay apparatuses 101 and 102 receive the information distributed from the management apparatus 200 in S1204. The overlay control units 112 of the packet relay apparatuses 101 and 102 set the identifier of the tunnel communication path in the tunnel communication path 630, and the information (VTEPs and IP addresses) related to the VTEPs at both ends of the tunnel in the VTEP 620, the source IP address 640, and the destination IP address, and also set the network type, the tunnel guaranteed bandwidth (no setting), and the QoS priority, among the pieces of information distributed from the management apparatus via the management apparatus coordination units 111.

Figure 13:
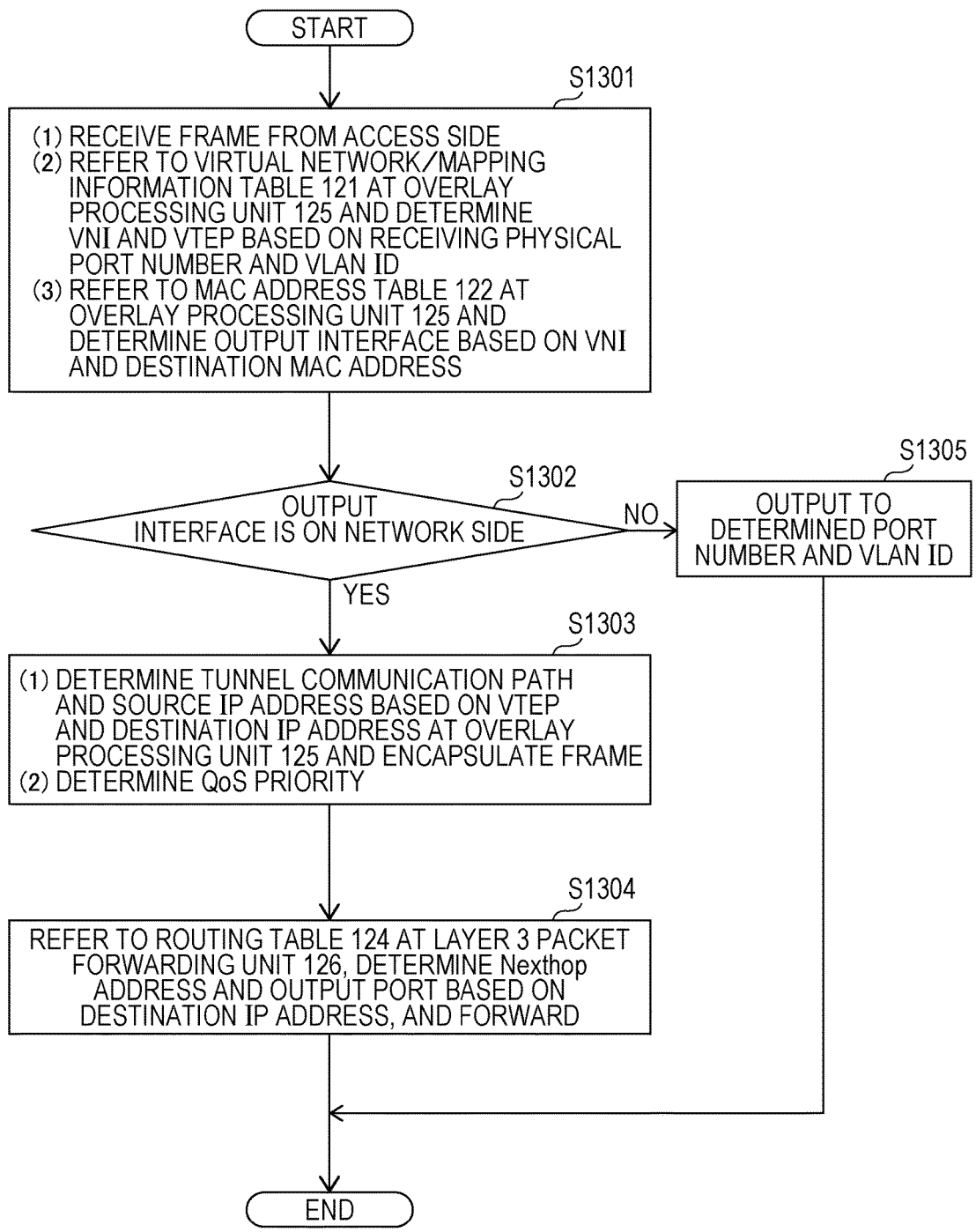
FIG. 13 is an explanatory flowchart from when the packet relay apparatus receives a frame from an access port to when transmitting it.

The flowchart from when the packet relay apparatus receives a frame from an access port to when transmitting it is described with reference to FIG. 13. In FIG. 13, a description is given of a process where the packet relay apparatus of FIG. 2 forwards a frame from the L2 network 411 to the L3 network 401.

The packet relay apparatus 101 receives a frame from the L2 network 411 on the access side. The overlay processing unit 125 refers to the virtual network/mapping information table 121, and determines a VNI and a VTEP based on a receiving physical port number and a VLAN ID. The overlay processing unit 125 refers to the MAC address table 122, and determines an output interface based on the VNI and a destination MAC address (S1301). The output interface (physical IF) is judged whether to be on the network side or the access side (S1302). If the output interface is on the network side, the overlay processing unit 125 determines a tunnel communication path and a source IP address based on the VTEP and the destination IP address, and encapsulates the frame (S1303). The Layer 3 packet forwarding unit 126 refers to the routing table 124, determines a Nexthop address and an output port based on the destination IP address, and forwards the packet (S1304). If the output interface is on the access side, the packet is output to the L2 network (411 or 412) via the determined physical IF (11 or 12) corresponding to the port number and the VLAN ID (S1305).

Figure 14:
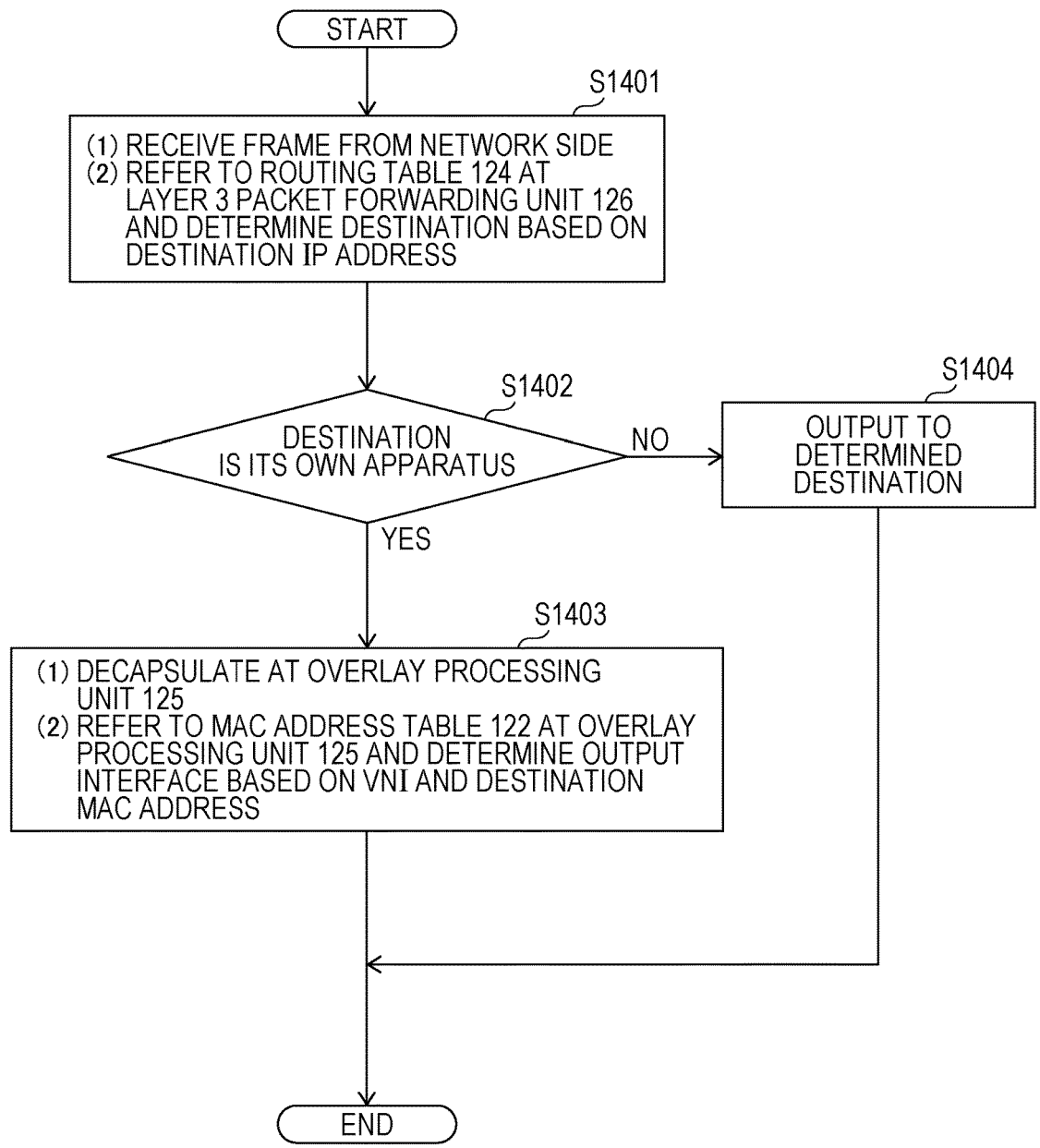
FIG. 14 is an explanatory flowchart from when the packet relay apparatus receives a frame from a network port to when transmitting it.

The flowchart from when the packet relay apparatus receives a frame from a network port to when transmitting it is described with reference to FIG. 14. In FIG. 14, it is a process of forwarding a frame from the L3 network 401 to the L2 network 411.

The packet relay apparatus 101 receives a frame addressed to itself from the network side. The Layer 3 packet forwarding unit 126 refers to the routing table 124, and determines a destination based on the destination IP address (S1401). It is judged whether or not the destination is itself (S1402). In a case of itself, the overlay processing unit 125 performs decapsulation. The overlay processing unit 125 refers to the MAC address table 122 and determines an output interface based on the VNI and the destination MAC address (S1403). If the destination is other than itself, the Layer 3 packet forwarding unit 126 searches the routing table 124 and outputs to the destination determined based on the output interface 720 (S1404).

Figure 15:
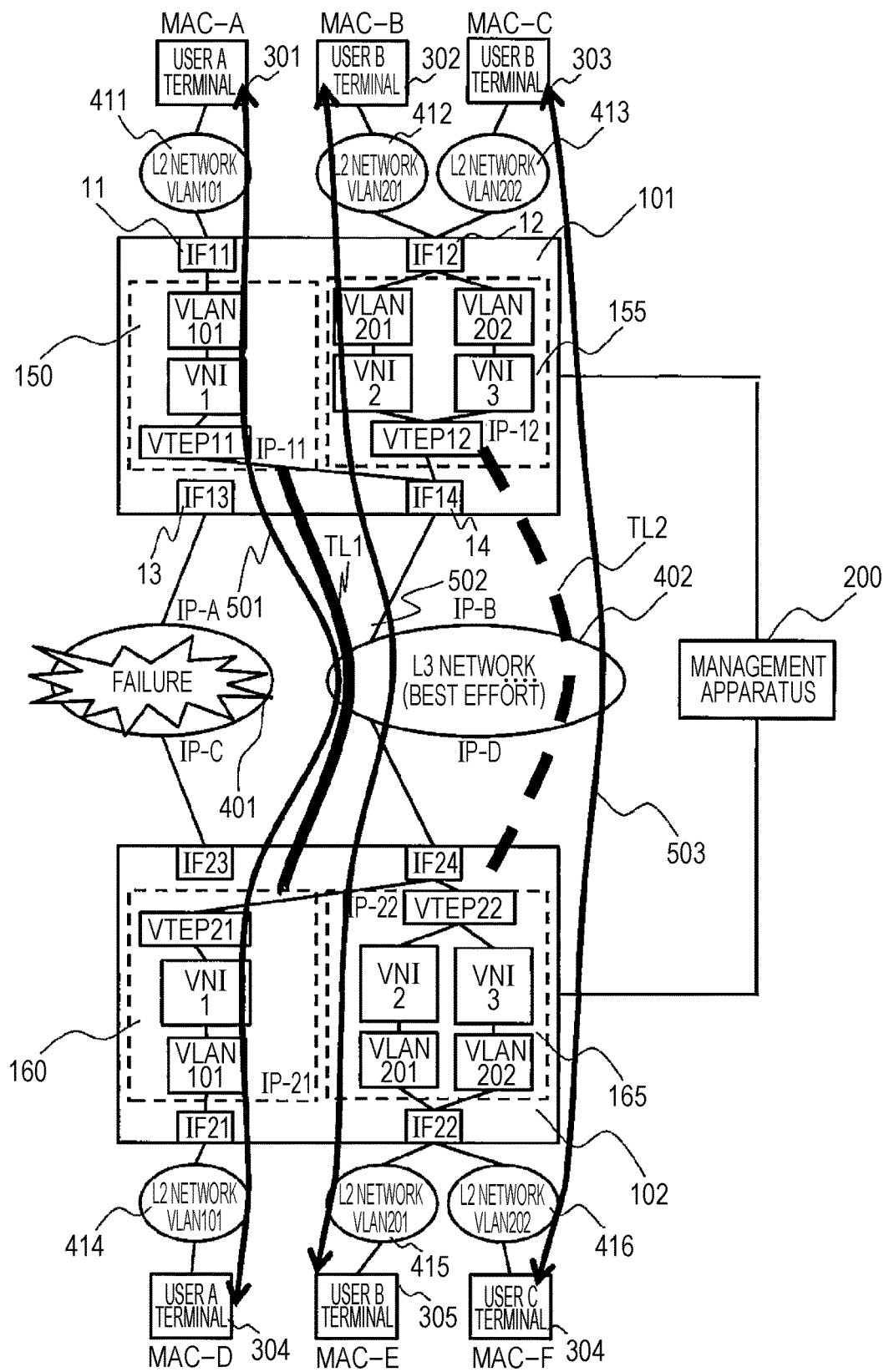
FIG. 15 is an explanatory diagram of a communication restoration method of when a network failure has occurred in a virtual network system.

A communication restoration method in a case where a network failure has occurred in a virtual network system is described with reference to FIG. 15. In FIG. 15, a system configuration and a hardware configuration of the apparatus are similar to those of FIG. 1.

The tunnel route 501 between the user A terminal 301 and the user A terminal 304 normally uses the L3 network (bandwidth guarantee) 401 as illustrated in FIG. 1. A failure in the L3 network (bandwidth guarantee) 401 is monitored between the packet relay apparatuses 101 and 102. If a failure has been detected in the L3 network (bandwidth guarantee) 401, the routing control unit 113 of the packet relay apparatus 101 changes the nexthop address addressed to IP-21 from IP-A to IP-B, and the output port number from IF 13 to IF 14 in the routing table 124. The routing control unit 113 of the packet relay apparatus 102 changes the nexthop address addressed to IP-11 from IP-C to IP-D, and the output port number from IF-23 to IF 24 in the routing table. The tunnel communication path TL 1 between the VTEPs 11 and 21 is changed to a setting that uses the L3 network (best effort) 402. The communication route between the user A terminal 301 and the user A terminal 304 is changed to use the L3 network (best effort) 402. A higher QoS priority is set for communication between the VTEPs 11 and 21 for bandwidth guarantee. Accordingly, the communication is forwarded with a higher priority than communication between VTEPs 12 and 22 for best effort.

Figure 16:
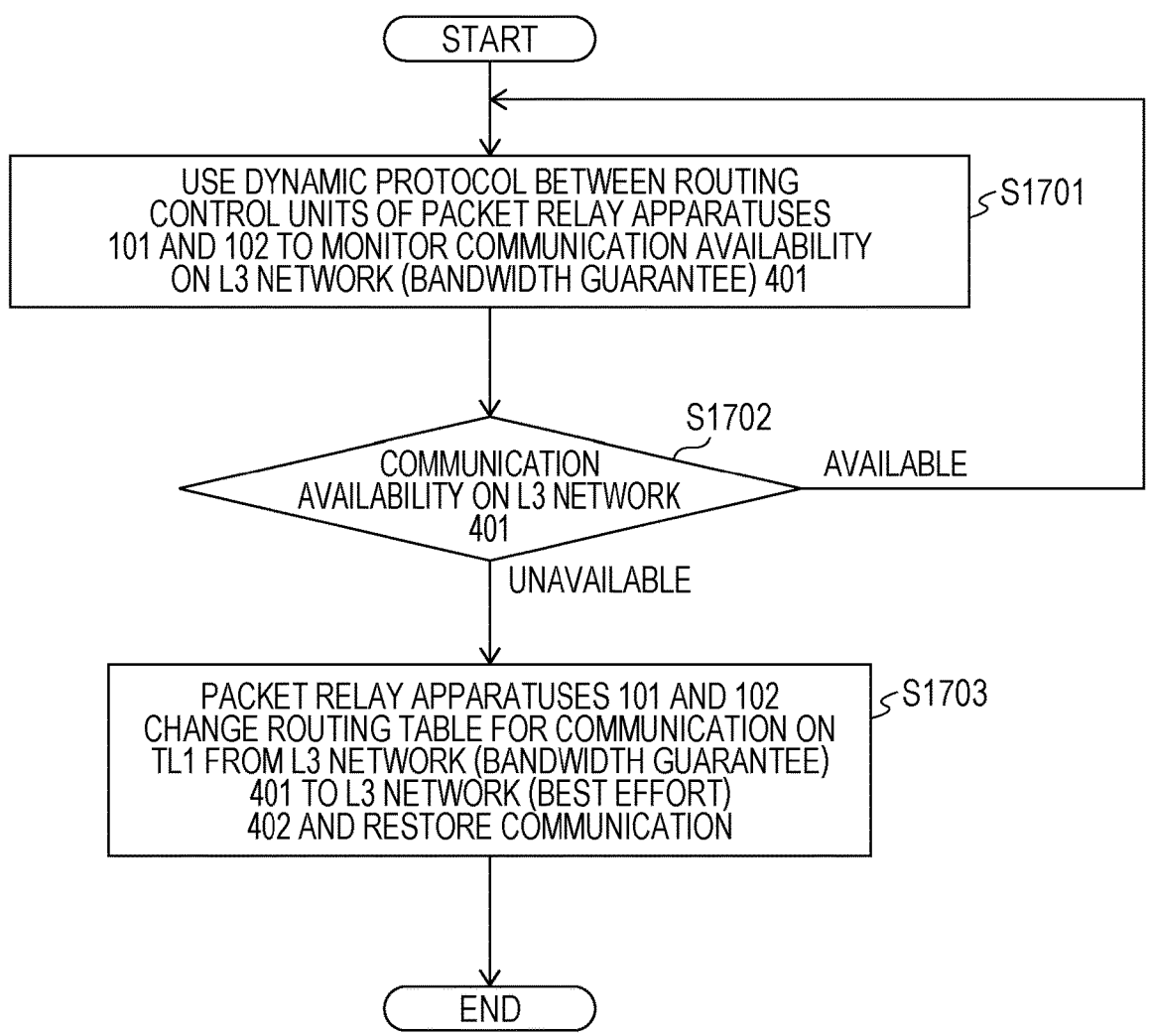
FIG. 16 is an explanatory flowchart of a communication restoration method of when a network failure has occurred in the virtual network system.

An explanatory flowchart of a communication restoration method of when a network failure has occurred in a virtual network system is described with reference to FIG. 16.

A dynamic protocol is used between the routing control units of the packet relay apparatuses 101 and 102 to monitor communication availability of the L3 network (bandwidth guarantee) 401 (S1701). The monitoring method is to operate an IP routing protocol such as RIP, OSPF, and BGP between the packet relay apparatus 101, a packet relay apparatus in the L3 network (bandwidth guarantee) 401, and the packet relay apparatus 102 for monitoring. When a failure has occurred in the L3 network (bandwidth guarantee) 401, the packet relay apparatus 101 receives a route delete notification addressed to IP-11 in a control frame from an adjacent packet relay apparatus in the L3 network 401, and detects the failure in the L3 network (bandwidth guarantee) 401. The packet relay apparatus 102 receives a route delete notification addressed to IP-2l in a control frame from an adjacent packet relay apparatus in the L3 network 401, and detects the failure in the L3 network (bandwidth guarantee) 401.

Figure 17:
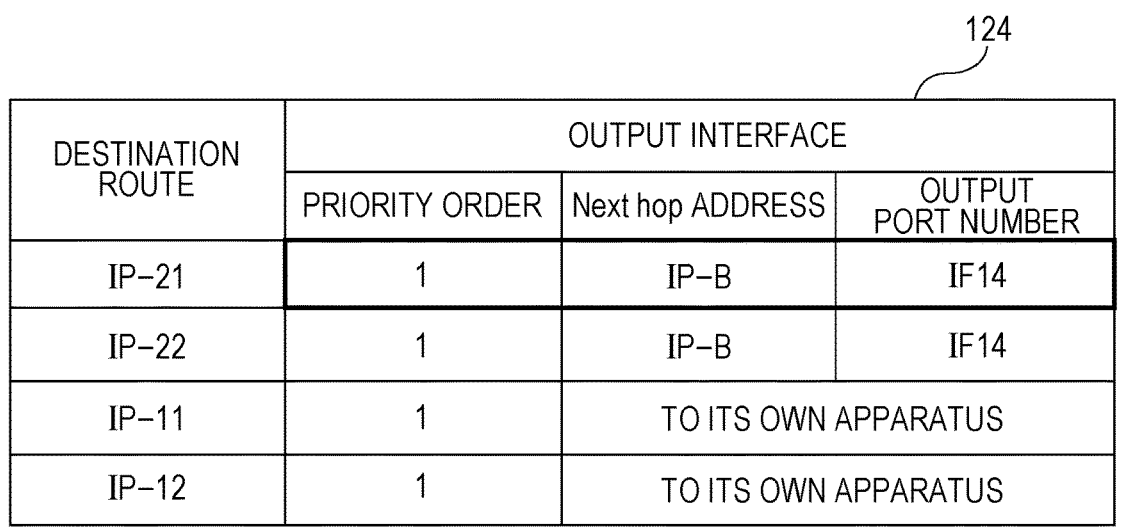
FIG. 17 is an explanatory diagram of a routing table after the network failure.

When the routing control unit 113 monitors communication availability of the L3 network (bandwidth guarantee) 401 and detects the unavailability of communication, the packet relay apparatuses 101 and 102 change their routing table for communication on Tl1 from the L3 network (bandwidth guarantee) 401 to the L3 network (best effort) 402, and restore communication (S1703). The routing table is changed in S1703 as follows. FIG. 7 is the routing table of the packet relay apparatus 101 before a network failure. The destination route IP-21 to the VTEP 11 for bandwidth guarantee of the packet relay apparatus 101 has a first priority Nexthop address, IP-A, and output port number, IF 13. On the other hand, FIG. 17 illustrates the routing table of the packet relay apparatus 101 after the network failure. In the routing table 124, the destination route IP-21 to the VTEP 11 for bandwidth guarantee of the packet relay apparatus 101 has a Nexthop address, IP-B, and an output port number, IF 14, after the process of the routing control unit 113 in S1703.

In the example, the routing control unit detects the state of the L3 network 401 by the routing protocol. However, if the packet relay apparatus 101 monitors the state of the L3 network 401 in another method, and becomes impossible to continue communication due to an abnormality in the state of the L3 network 401 as a result of the monitoring, the communication routes may be switched. For example, if the monitoring result shows a state of congestion in the L3 network 401, the communication routes may be switched.

Figure 18:
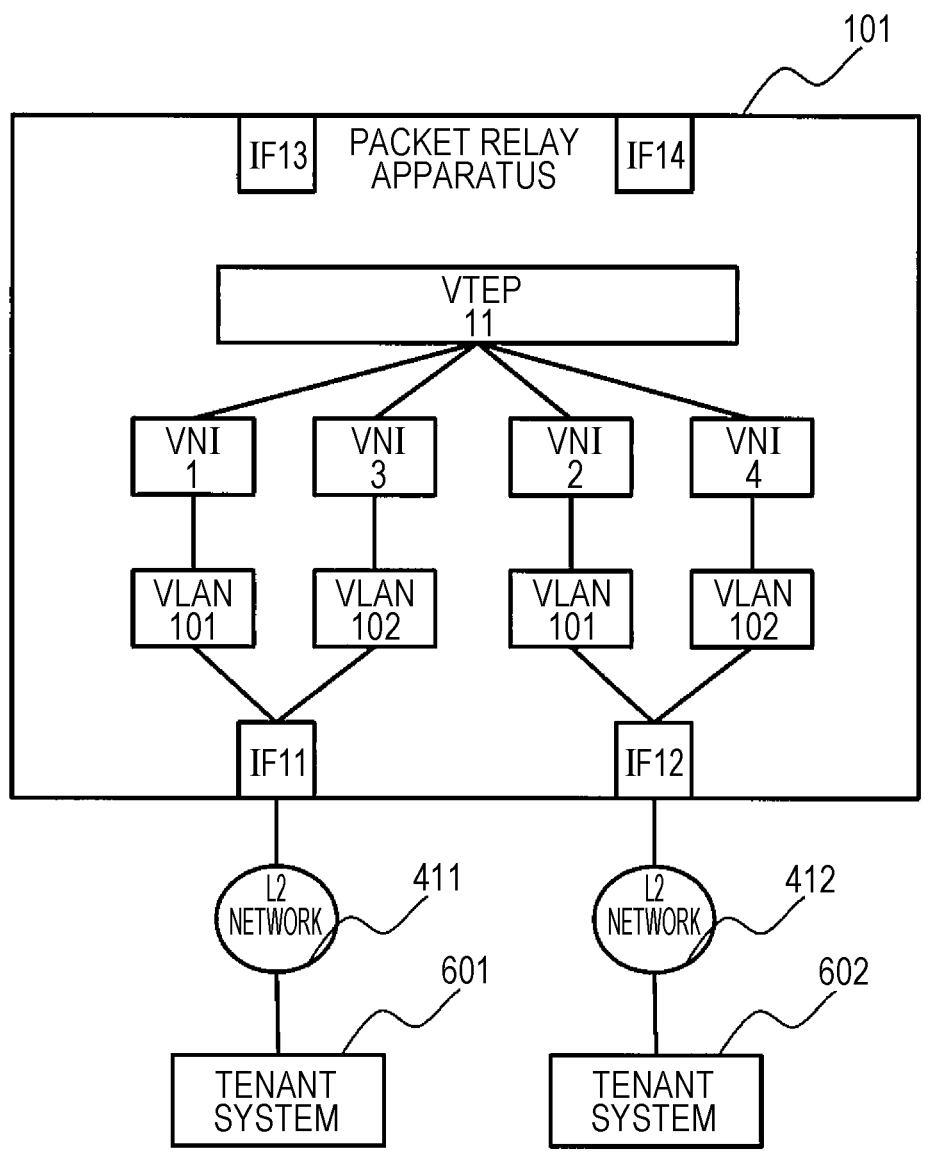
FIG. 18 is an explanatory diagram of configuration information in a case where different ports belong to separate VNIs in the same VLAN in the packet relay apparatus.

Configuration information in a case where different ports belong to separate VNIs in the same VLANs in a packet relay apparatus is described with reference to FIG. 18.

The tenant systems 601 and 602 are separate systems, but already use the VLANs 101 and 102 with the same VLAN-IDs, respectively. In order to create separate virtual networks in the packet relay apparatus 101 without changing their VLAN IDs, a virtual network identifier (VNI) is assigned based on a combination of a physical port and a VLAN ID. The tenant system 601 is connected to the physical port IF 11 of the packet relay apparatus 101 via the L2 network 411. The tenant system 602 is connected to the physical port IF 12 of the packet relay apparatus 101 via the L2 network 411. The VLAN 101 of the physical port IF 11 is mapped to the VNI 1, the VLAN 102 of the physical port IF 11 to the VNI 3, the VLAN 101 of the physical port IF 12 to the VNI 2, and the VLAN 102 of the physical port IF 12 to the VNI 4. The virtual network identifiers are individually different so that communication cannot be carried out between the VLAN 101 of the tenant system 601 and the VLAN 101 of the tenant system 602. Communication cannot be similarly carried out between the VLAN 102 of the tenant system 601 and the VLAN 102 of the tenant system 602, either.

Configuration information of a case of belonging to the same VNI in different VLANs in a packet relay apparatus is described with reference to FIG. 19.

In Layer 2 forwarding between virtual machines in a physical server, a communication has conventionally been made by being forwarded back in a virtual switch in the physical server. However, the forwarding back in the virtual switch applies heavy load to a CPU of the physical server. There is a standard for offloading a hypervisor in the physical server, called VEPA (Virtual Ethernet (registered trademark) Port Aggregator), to a physical switch, to reduce the load on the CPU of the physical server. However, the hypervisor does not support it.

Figure 19:
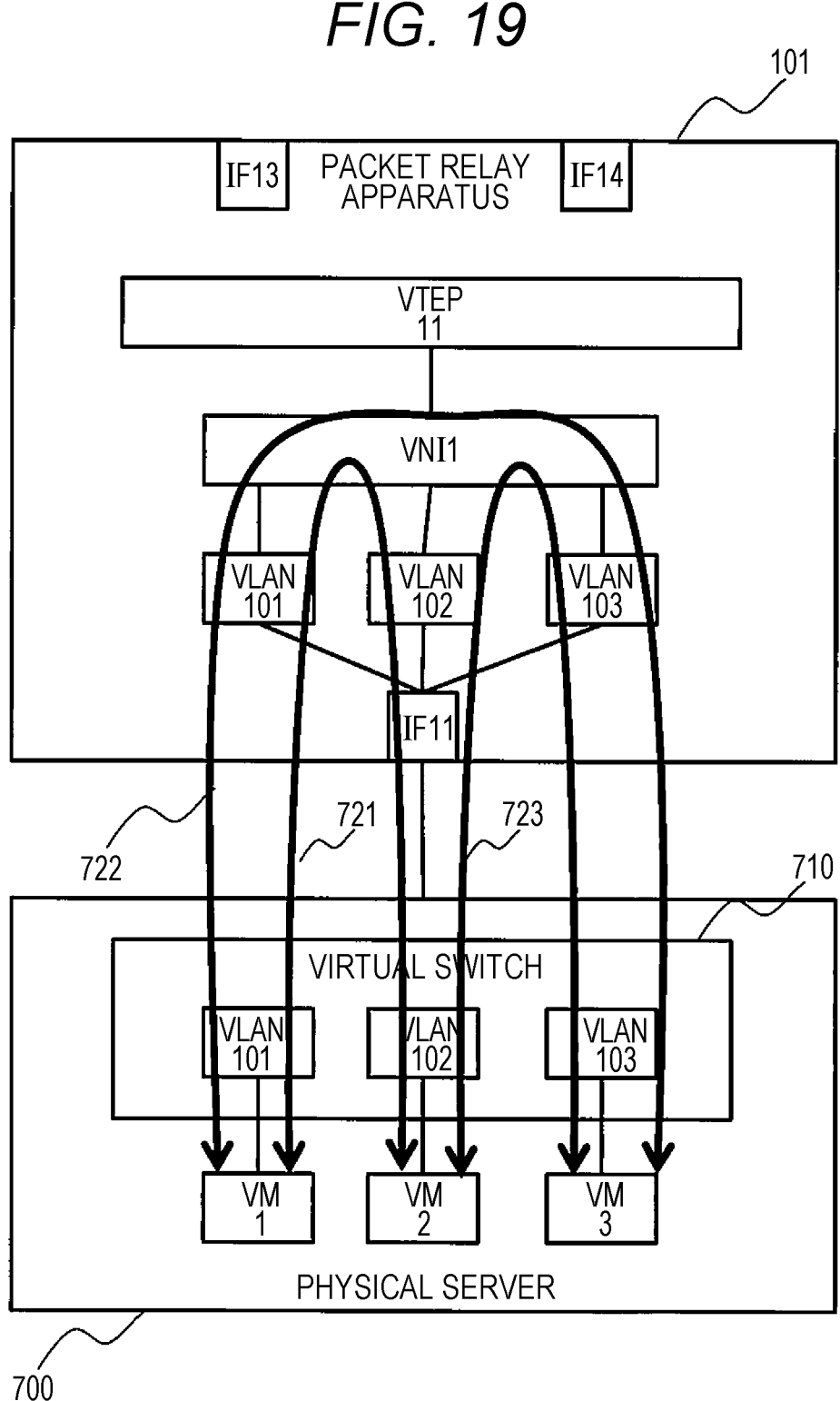
FIG. 19 is an explanatory diagram of configuration information in a case of belonging to the same VNI in different VLANs in the packet relay apparatus.

FIG. 19 illustrates a method to solve this issue. In FIG. 19, a physical server 700 includes virtual machines VM 1 to 3, and a virtual switch 710. In the virtual switch, the VLAN 101 is assigned to the VM 1, the VLAN 102 to the VM2, and the VLAN 103 to the VM 3. The packet relay apparatus 101 corresponding to a physical switch is connected to the physical server 700 via the physical port IF 11. The VLANs 101, 102, and 103 are set for the IF 11. The VLANs 101, 102, and 103 of the physical port IF 11 are assigned to the virtual network identifier VNI 1. With the settings, a communication between the VMs 1 and 2 becomes a virtual machine communication 721 that is forwarded from the physical server 700 and back via the packet relay apparatus 101. A communication between the VMs 1 and 3 similarly becomes a virtual machine communication 722 that is forwarded from the physical server 700 and back via the packet relay apparatus 101. A communication between the VMs 2 and 3 similarly becomes a virtual machine communication 723 that is forwarded from the physical server 700 and back via the packet relay apparatus 101.

The following aspects have been described with the above-mentioned examples.

As one aspect, in order to tunnel L2 over L3 in a packet relay apparatus, two or more virtual tunnel endpoints are provided in all packet relay apparatuses that tunnel L2 over L3. A different IP address is assigned to each virtual tunnel endpoint in a packet relay apparatuses that tunnels L2 over L3. If there are two or more communication routes between specific packet relay apparatuses, a routing table is set in such a manner as that a tunnel 1 connected between a first tunnel endpoint in a first packet relay apparatus and a first tunnel endpoint in a second packet relay apparatus, and a tunnel 2 connected between a second tunnel endpoint in the first packet relay apparatus and a second tunnel endpoint in the second packet relay apparatus take different routes, respectively. When a communication network where the tunnel 1 passes is assumed to be for bandwidth guarantee, and a communication network where the tunnel 2 passes to be for best effort, a packet is forwarded, causing a tenant that desires to secure a bandwidth to belong to the first tunnel endpoint of each packet apparatus, and a tenant that does not need to secure a bandwidth to belong to the second tunnel end point. Accordingly, it becomes possible to implement bandwidth guarantee and priority control on communications of the specific tenant.

Moreover, as one aspect, a plurality of virtual tunnel endpoints is provided in communication apparatuses. The virtual tunnel endpoints are divided into a virtual tunnel endpoint that makes a communication of a specific tenant and a virtual tunnel endpoint that makes a communication of another tenant. A forwarding route from the virtual tunnel endpoint that makes a communication of the specific tenant (terminal) is separated from a forwarding route from the virtual tunnel point that makes a communication of the other tenant. Accordingly, a communication of the specific tenant is forwarded with priority. It makes it possible to forward a communication of the specific tenant (terminal) with priority in a virtual network system, among communications of the plurality of tenants (terminals) between communication apparatuses in a virtual network system.

Moreover, as one aspect, when a packet relay apparatus tunnels L2 over L3, a virtual access point connecting a VNI to a tenant system is identified with a combination of a VLAN and a physical port. Different tenant systems are connected to separate ports in one packet relay apparatus. Separate VNIs are assigned to the same VLAN of different ports. Accordingly, it becomes possible that separate virtual networks are assigned to different tenant systems. The same VNI is assigned to different VLANs in one packet relay apparatus to enable Layer 2 forwarding between the different VLANs.

Moreover, as one aspect, when a packet relay apparatus tunnels L2 over L3, the packet relay apparatus monitors a failure and congestion on a tunnel communication route. If a failure or congestion is detected, communication is carried out by changing the communication route to a predetermined bypass route. Accordingly, it becomes possible to dynamically avoid a failure and congestion.

What is claimed is:

1. A first communication apparatus placed between a terminal accommodated in a first Layer 2 network connected to the first communication apparatus and a terminal accommodated in a second Layer 2 network at a second communication apparatus, the first communication apparatus being connected to the second communication apparatus on a Layer 3 network, the first communication apparatus comprising:

a first port connected to a first Layer 3 network;
a second port connected to a second Layer 3 network;
a third port connected to the first Layer 2 network;
a memory storing:
an association among a virtual tunnel endpoint (VTEP) assigned an individual source IP address, a virtual local area network (VLAN) to which a terminal apparatus accommodated in the first communication apparatus belongs, and a virtual network identifier (VNI),
associations between individually different VNIs depending on the VLANs with the same VLAN number, and different virtual VTEPs, which are configured for a plurality of Layer 2 networks connected to the different third physical ports,
a combination of an output destination of the first Layer 3 network, the first port, and a first priority, and a combination of an output destination of the second Layer 3 network, the second port, and a second priority lower than the first priority, for identifying a routing related to a first tunnel route created in a Layer 3 network between a first VTEP in the first communication apparatus and a first VTEP in the second communication apparatus,
a combination of an output destination of the second Layer 3 network, the second port, and a second priority lower than the first priority,
a combination of the output destination of the second Layer 3 network, and the second port, for identifying a routing related to a second tunnel route created in a Layer 3 network between a second VTEP in the first communication apparatus and a second VTEP in the second communication apparatus, and
QoS priority indicating packet transmission priority on the same tunnel route for each VTEP;
a software processing module configured to monitor a state of the first Layer 3 network in accordance with a routing protocol and switch the combinations of the output destinations of the first tunnel route based on the monitoring result; and
a relay processing module configured to receive a Layer 2 frame transmitted from the terminal apparatus accommodated in the first communication apparatus to a terminal apparatus accommodated in the second communication apparatus, encapsulate the Layer 2 frame in a Layer 3 packet based on the Layer 2 frame and the association among the VLAN, the VNI, and the VTEP, and transmit the encapsulated packet to a tunnel route, wherein, upon the state of the first layer 3 network being normal as a result of the monitoring, the relay processing module is further configured to:

guarantee a communication bandwidth for a communication of a terminal belonging to a VLAN associated with the first VTEP on the first tunnel route, and transmits a packet to the first layer 3 network via the first port, share a bandwidth for a communication of a terminal belonging to each VLAN associated with the second VTEP on the second tunnel route, and transmits a packet to the second layer 3 network via the second port, upon the state of the first layer 3 network being abnormal as a result of the monitoring, the software processing module is further configured to:

switch the combinations of the output destinations of the first tunnel route, and the relay processing module is further configured to:

transmit a packet in accordance with QOS priority associated with each VTEP in terms of a communication of a terminal belonging to a VLAN associated with the first and second tunnel routes.

2. A first communication apparatus placed between a terminal accommodated in a Layer 2 network connected to the first communication apparatus and a terminal accommodated in a Layer 2 network connected to a second communication apparatus, the first communication apparatus being connected to the second communication apparatus on a Layer 3 network, the first communication apparatus comprising:

a memory which stores an association among any of a plurality of virtual tunnel endpoints (VTEPs) assigned individual source IP addresses, a VLAN to which a terminal apparatus accommodated in the first communication apparatus belongs, and a virtual network identifier (VNI);

a software processing module configured to set routings related to a first tunnel route created in a Layer 3 network between a first VTEP in the first communication apparatus and a first VTEP in the second communication apparatus, and a second tunnel route created in a Layer 3 network between a second VTEP in the first communication apparatus and a second VTEP in the second communication apparatus; and a relay processing module configured to receive a Layer 2 frame transmitted from the terminal apparatus accommodated in the first communication apparatus to a terminal apparatus accommodated in the second communication apparatus, encapsulate the Layer 2 frame in a Layer 3 packet based on the Layer 2 frame and the association among the VLAN, the VNI, and the VTEP, and transmit the encapsulated packet to a tunnel route based on the routing.

3. The first communication apparatus according to claim 2, wherein the relay processing module, in terms of VTEPs created on a Layer 3 network different from the first tunnel route and the second tunnel route, is further configured to:

provide a service to guarantee a communication bandwidth of the first tunnel to a VTEP associated with one VLAN and creating the first tunnel route, and provide a communication service where a communication through the second tunnel is made in best effort to a VTEP associated with a plurality of VLANs and creating the second tunnel route.

4. The first communication apparatus according to claim 2, further comprising:

a first port connected to a first Layer 3 network; and a second port connected to a second Layer 3 network, wherein the software processing module is further configured to:

associate a routing of the first VTEP creating the first tunnel route with a combination of an output destination of the first Layer 3 network, the first port, and a first priority, and a combination of an output destination of the second Layer 3 network, the second port, and a second priority lower than the first priority, associate a routing of the second VTEP creating the second tunnel routing with an output destination to the second Layer 3 network and the second port, and monitor a state of the first Layer 3 network in accordance with a routing protocol, and switch the combinations of the output destinations of the first tunnel route based on the monitoring result, and wherein the relay processing unit module is further configured to:

transmit a packet to the output destination associated with the first tunnel route in accordance with the priority.

5. The first communication apparatus according to claim 4, wherein, upon the state of the first Layer 3 network being normal as a result of the monitoring, the relay processing module is further configured to:

provide a service to guarantee a communication bandwidth to a communication of a terminal belonging to a VLAN associated with the first VTEP on the first tunnel route, and provide a communication service in best effort where a bandwidth is shared, to a communication of a terminal belonging to each VLAN associated with the second VTEP in the second tunnel route.

6. The first communication apparatus according to claim 4, wherein the software processing module is further configured to:

associate the VTEP with QoS priority indicating packet transmission propriety on the same tunnel route, and wherein, upon the state of the first Layer 3 network being normal as a result of the monitoring, the relay processing module is further configured to:

guarantee a communication bandwidth for a communication of a terminal belonging to a VLAN associated with the first VTEP on the first runnel tunnel route, and transmits a packet to the first Layer 3 network via the first port, and share a bandwidth for a communication of a terminal belonging to each VLAN associated with the second VTEP on the second tunnel route and transmits a packet to the second Layer 3 network via the second port, and wherein, upon the state of the first Layer 3 network being abnormal as a result of the monitoring, the software processing module is further configured to:

switch the combinations of the output destinations of the first tunnel route, and wherein the relay processing module is further configured to:

transmit a packet in accordance with QOS priority associated with each VTEP in terms of a communication of a terminal belonging to a VLAN associated with the first and second tunnel routes.

7. The first communication apparatus according to claim 2, further comprising:

a plurality of physical ports connected to the Layer 2 networks, wherein in the Layer 2 networks are connected to the different physical ports,
wherein separate virtual network identifiers are assigned to VLANs with the same VLAN number, and
wherein the VLAN is caused to belong to a separate VTEP for each virtual network identifier to separate communication routes.

8. A packet communication method between a first communication apparatus accommodating terminals connected via a plurality of first Layer 2 networks, and a second communication apparatus accommodating terminals connected via a plurality of second Layer 2 networks, the packet communication method comprising:
  each of the first and second communication apparatuses using a different IP address for each virtual tunnel endpoint (VTEP) to create tunnel routes respectively in a plurality of Layer 3 networks;
  setting a virtual network identifier (VNI) for a VLAN corresponding to each first layer 2 network;
  receiving a Layer 2 frame from the first Layer 2 network;
  carrying out encapsulation in a Layer 3 packet based on the association of the VLAN, the VNI, and the VTEP based on a VLAN to which a source terminal of the Layer 2 frame belongs, and transmitting the encapsulated packet to a tunnel route;
  assigning one VNI to a VTEP corresponding to a first tunnel route, and occupying a bandwidth of a first Layer 3 network creating the first tunnel route for a communication of a terminal belonging to the one VNI;
  assigning a plurality of VNIs to a VTEP corresponding to a second tunnel route, and sharing a bandwidth of a second Layer 3 network creating the second tunnel route for communications of terminals belonging to the plurality of VNIs; and
  upon detecting an abnormality on the first tunnel route, sharing the bandwidth of the second Layer 3 network, and making a communication of a terminal belonging to a VNI assigned to a VTEP supporting the first and second tunnel routes.

* * * * *